(12) United States Patent
Nakashima

(10) Patent No.: US 6,622,805 B2
(45) Date of Patent: Sep. 23, 2003

(54) PARALLEL HYBRID ELECTRIC VEHICLE

(75) Inventor: Kenji Nakashima, Shizuoka (JP)

(73) Assignee: Jatco LTD, Fuji (JP)

( * ) Notice: Subject to any disclaimer, the term of this patent is extended or adjusted under 35 U.S.C. 154(b) by 9 days.

(21) Appl. No.: 10/084,449

(22) Filed: Feb. 28, 2002

(65) Prior Publication Data

US 2002/0117339 A1 Aug. 29, 2002

(30) Foreign Application Priority Data

Feb. 28, 2001 (JP) ........................................ 2001-055722

(51) Int. Cl.$^7$ .............................. B60K 6/04; B60L 11/16
(52) U.S. Cl. ...................... 180/65.2; 180/65.3; 701/22
(58) Field of Search ............................... 180/65.2, 65.3, 180/65.4, 65.6, 65.8; 701/22; 477/5

(56) References Cited

U.S. PATENT DOCUMENTS

| | | | | |
|---|---|---|---|---|
| 5,846,155 A | * | 12/1998 | Taniguchi et al. | 477/2 |
| 5,944,630 A | * | 8/1999 | Omote | 477/5 |
| 5,951,614 A | * | 9/1999 | Tabata et al. | 701/54 |
| 6,018,694 A | * | 1/2000 | Egami et al. | 701/102 |
| 6,054,776 A | | 4/2000 | Sumi | 290/17 |
| 6,067,801 A | * | 5/2000 | Harada et al. | 60/705 |
| 6,077,186 A | * | 6/2000 | Kojima et al. | 477/3 |
| 6,278,915 B1 | * | 8/2001 | Deguchi et al. | 701/22 |
| 6,359,404 B1 | * | 3/2002 | Sugiyama et al. | 318/432 |
| 6,453,222 B1 | * | 9/2002 | Lasson et al. | 701/22 |
| 6,490,511 B1 | * | 12/2002 | Raftari et al. | 701/22 |
| 6,512,967 B2 | * | 1/2003 | Ostberg et al. | 701/22 |
| 6,533,701 B2 | * | 3/2003 | Maruyama | 477/5 |

FOREIGN PATENT DOCUMENTS

JP        10-304513        11/1998

* cited by examiner

Primary Examiner—Brian L. Johnson
Assistant Examiner—Jeffrey J Restifo
(74) Attorney, Agent, or Firm—Foley & Lardner

(57) ABSTRACT

In a parallel hybrid electric vehicle, when the difference in number of revolutions between an engine and a motor/generator is smaller than a predetermined value at starting of the vehicle, an ECU sets a predetermined torque correction amount in accordance with the relationship between an engine inertia and a motor/generator inertia. The ECU carries out correction of torque of one of the engine and the motor/generator in accordance with the predetermined torque correction amount as set.

13 Claims, 13 Drawing Sheets

PARALLEL HYBRID ELECTRIC VEHICLE

BACKGROUND OF THE INVENTION

The present invention relates to parallel hybrid electric vehicles comprising an engine and a motor which also serves as a generator, wherein output torques of the two are transferred to a transmission through a torque combining mechanism comprising a differential gear so as to obtain traction by means of one or both of the engine and the motor.

In a typical parallel hybrid electric vehicle, output torques of the engine and the motor/generator are combined through a torque combining mechanism comprising a planetary-gear set, which is transferred to driving wheels through a transmission. The vehicle carries out starting acceleration, for example, with combined output torques of the motor/generator and the engine. In a higher-speed range, the vehicle cruises using only engine output torque with the motor/generator turned off. Specifically, when the number of revolutions of the motor/generator reaches that of the engine, the two, and more specifically, elements of the planetary-gear set coupled with the two, are directly coupled with each other through an engagement device such as clutch, allowing vehicle cruising only with engine torque. At vehicle deceleration, the motor/generator is rotated with road reaction torque to serve as a generator for power accumulation, achieving regenerative operation so called. That is, the parallel hybrid electric vehicle aims to achieve more efficient cruising, e.g. higher accelerating force and lower fuel consumption, by controlling the operating conditions of the motor/generator, i.e. number of revolutions and output torque.

SUMMARY OF THE INVENTION

In the above parallel hybrid electric vehicle, at starting from a standstill, for example, the engine speed is restrained at a predetermined value to generate normal-direction torque or vehicle accelerating direction in the motor/generator for vehicle starting. When the number of revolutions of the motor/generator coincides exactly or roughly with that of the engine, input shafts of the engine, motor/generator, and automatic transmission are directly coupled with each other through engagement of the engagement device. At engagement of the engagement device, torsional vibrations occur in the drive system, which are transferred as discomfort vibrations to a passenger or occupant. This problem occurs even when a one-way clutch for allowing one-direction rotation serves as the engagement device.

It is, therefore, an object of the present invention to provide parallel hybrid electric vehicles which contribute to restraint of vibrations at engagement of the engagement device.

The present invention provides generally a parallel hybrid electric vehicle which comprises: an engine; a motor/generator having functions of a motor and a generator; a transmission; a differential gear comprising a first shaft connected to an output shaft of the engine, a second shaft connected to an output shaft of the motor/generator, and a third shaft connected to an input shaft of the transmission; an engagement device interposed between two of the first to third shafts of the differential gear, the engagement device being engaged when a difference in number of revolutions between the engine and the motor/generator is smaller than a predetermined value at starting of the vehicle; and an electronic control unit (ECU) which controls operating conditions of at least one of the engine and the motor/generator, wherein when the difference in number of revolutions is smaller than the predetermined value, the ECU sets a predetermined torque correction amount in accordance with a relationship between an inertia of the engine and that of the motor/generator, and wherein the ECU carries out a correction of torque of one of the engine and the motor/generator in accordance with the predetermined torque correction amount as set.

A main feature of the present invention is to provide a parallel hybrid electric vehicle which comprises: an engine; a motor/generator having functions of a motor and a generator; a transmission; a differential gear comprising a first shaft connected to an output shaft of the engine, a second shaft connected to an output shaft of the motor/generator, and a third shaft connected to an input shaft of the transmission; an engagement device which carries out engagement and release between two of the first to third shafts of the differential gear; and an ECU which, at starting of the vehicle, puts the engagement device in a non-engaged state and controls torque of the motor/generator to maintain a number of revolutions of the engine at a predetermined number, wherein the ECU puts the engagement device in an engaged state when numbers of revolutions of the first to third shafts of the differential gear agree at least substantially with each other, and wherein the ECU carries out one of the following operations of: decreasing the torque of the motor/generator at engagement of the engagement device when an inertia of the motor/generator is smaller than a value obtained by multiplying an inertia of the engine by a gear ratio of the differential gear; increasing the torque of the motor/generator at engagement of the engagement device when the motor/generator inertia is larger than the value; increasing the torque of the motor/generator at engagement of the engagement device when the motor/generator inertia is smaller than the value; and decreasing the torque of the motor/generator at engagement of the engagement device when the motor/generator inertia is larger than the value.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
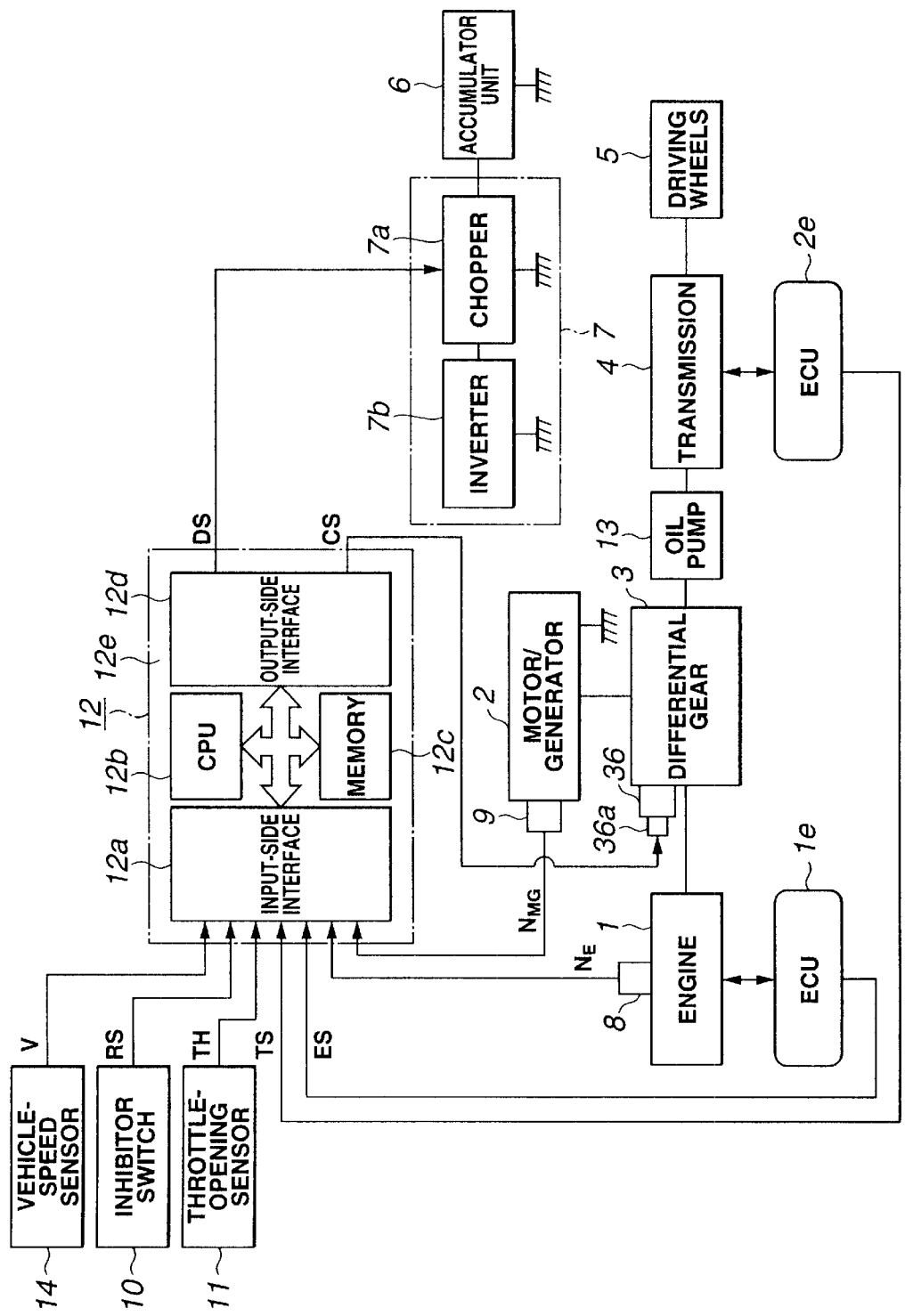
FIG. 1 is a block diagram showing a first embodiment of a parallel hybrid electric vehicle according to the present invention.

Referring to the drawings, a parallel hybrid electric vehicle embodying the present invention will be described. Referring first to FIG. 1, the parallel hybrid electric vehicle comprises an engine 1 and an AC motor/generator comprising a three-phase synchronous motor/generator or electric rotating driving source 2 acting as a generator and a motor, the output sides of which are connected to the input side of a differential gear or torque combining mechanism 3. The output side of the differential gear 3 is connected to the input side of a transmission 4 including no starting device such as torque converter, and the output side of the transmission 4 is connected to driving wheels 5 via a final reduction gear, not illustrated. In this embodiment, an oil pump 13 is provided between the differential gear 3 and the transmission 4 to produce the fluid pressure for controlling the transmission 4 and engaging/releasing a direct-coupled clutch of the differential gear 3.

The engine 1 is controlled by an engine electronic control unit (ECU) 1e, whereas the motor/generator 2 comprising a stator and a rotor is driven and controlled by a motor/generator drive circuit 7 connected to a storage device 6 comprising a chargeable battery and condenser. In this embodiment, engine torque is calculated and set by a motor/generator electronic control unit (ECU) 12, for example, wherein if engine torque is outputted as a command value to the engine ECU 1e, the engine ECU 1e uses this command value or engine torque as a target value or reference value for controlling engine torque.

The motor/generator drive circuit 7 comprises a chopper 7a connected to the storage device 6 and an inverter 7b connected between the chopper 7a and the motor/generator 2 and having, for example, six insulated gate bipolar transistors (IGBTs) to convert direct current into three-phase alternating current. When the chopper 7a inputs a duty control signal DS from the motor/generator ECU 12 as will be described later, a chopper signal of the duty ratio in accordance with the duty control signal DS is outputted to the inverter 7b. The inverter 7b forms, for example, gate control signals of the IGBTs so as to form the three-phase alternating current at the frequency synchronized with rotation of the motor/generator 2 so that it acts as a motor or a generator during normal rotation and reverse rotation in accordance with a rotational position detection signal of a position sensor, not illustrated, for detecting the rotational position of the motor/generator 2. Since the motor/generator 2 is also used for driving the vehicle like the engine 1, the rotating direction for driving the vehicle is defined as positive direction or normal rotation, and the opposite rotating direction is defined as negative direction or reverse rotation.

Figure 2:
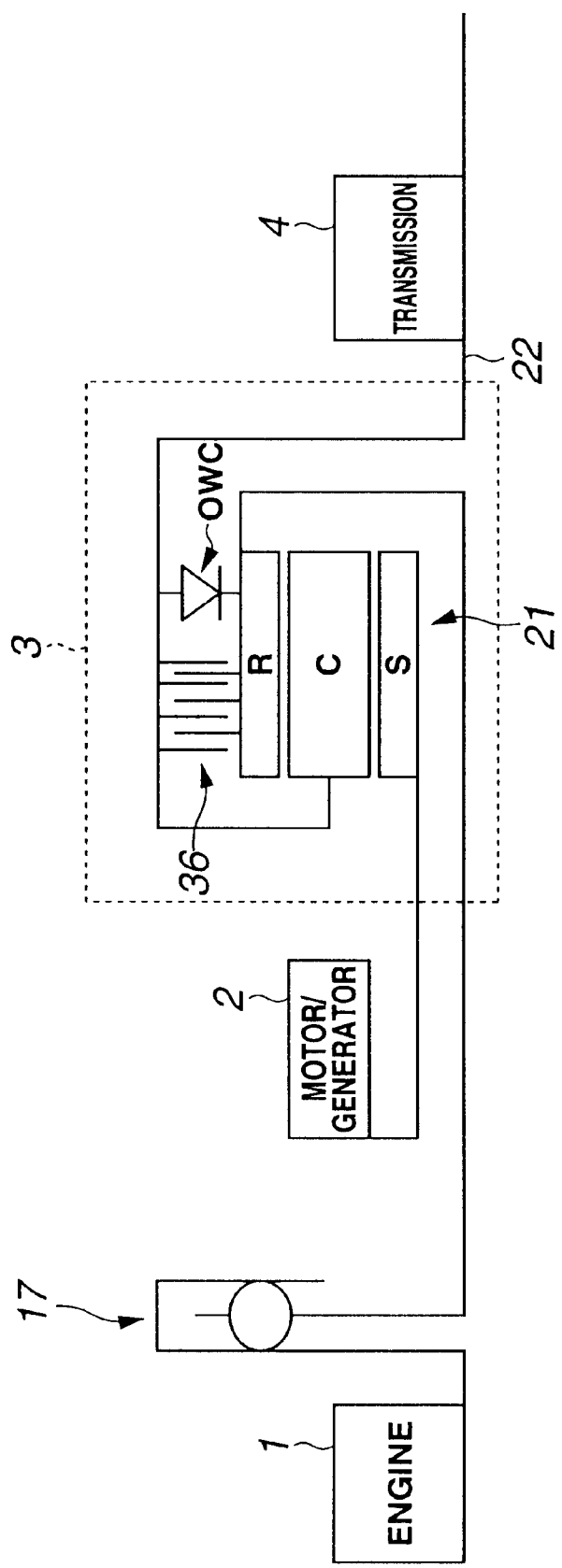
FIG. 2 is a schematic view showing the configuration of the parallel hybrid electric vehicle.

Referring to FIG. 2, the differential gear 3 comprises a planetary-gear set 21 as torque combining mechanism. The planetary-gear set 21 forms torque combining mechanism while generating the differential function between the engine 1 and the motor/generator 2. The planetary-gear set 21 comprises a sun gear S, a plurality of pinions P meshed therewith on the outer periphery at equal angle intervals, a pinion carrier C for connecting the pinions P (only pinion carrier C is shown representing the pinions P), and a ring gear R meshed with the pinions P on the outside, wherein the ring gear R is connected to the engine 1, and the sun gear S is connected to the rotor of the motor/generator 2, and the pinion carrier C is connected to an input shaft 22 of the transmission 4.

In this embodiment, it is assumed that when the gear ratio of the planetary-gear set 21 is α, a value obtained by multiplying an inertia $I_{eg}$ of the engine 1 by the gear ratio α is larger than an inertia $I_{mg}$ of the motor/generator 2.

Interposed between the ring gear R of the planetary-gear set 21 or engine 1 and the carrier C or transmission 4 are a direct-coupled clutch 36 for directly coupling the motor/generator 2 with the engine 1 through engagement of the two and a one-way clutch OWC. The direct-coupled clutch 36 includes a multiple-disk friction clutch to be engaged and released by the fluid pressure generated by the oil pump 13. The one-way clutch OWC controls so that the engine 1 rotates more slowly than the carrier C and the motor/generator 2 to allow rotation in the positive direction only. The engagement and release of the direct-coupled clutch 36 is controlled by a control signal provided to a solenoid 36a of a pressure control valve for controlling the working fluid pressure to the direct-coupled clutch 36, wherein when a direct-coupled clutch control signal CS provided to the solenoid 36a is at a high level, the direct-coupled clutch 36 is engaged, whereas when it is at a low level, the direct-coupled clutch 36 is released. The direct-coupled clutch control signal CS can be adjusted in a stepless way between the low level and the high level (substantially digitized), allowing engagement of the direct-coupled clutch 36 to be in the semi-engaged state for providing various engagement forces. In this embodiment, a damper 17 is arranged on the output side of the engine 1 to restrain explosive vibrations in the engine 1.

The transmission 4 is controlled by a transmission electronic control unit (ECU) 2e to the gear ratio of, e.g. the first gear to the fourth gear, which is determined by referring to a transmission control map preset in accordance with the vehicle speed and the throttle opening. The transmission 4 is an automatic transmission, and comprises an engine-brake clutch which can transmit through engagement thereof a reverse driving force or road reaction torque from the driving wheels, not illustrated, to the torque combining mechanism.

The engine 1 and the motor/generator 2 are provided with an engine speed sensor 8 and motor/generator revolutions sensor 9 for detecting the numbers of revolutions of their output shafts, respectively. They are also provided with an inhibitor switch 10 for outputting a range signal in accordance with a range selected with a select lever, not illustrated, and a throttle opening sensor 11 for detecting the throttle opening in accordance with depression of an accelerator. Revolutions-detection values $N_{eg}$, $N_{mg}$ of the sensors 8, 9, a vehicle-speed detection value $V_{sp}$ of a vehicle speed sensor 14, a range signal RS of the inhibitor switch 10, a throttle-opening detection value $T_{vo}$ of the throttle opening sensor 11, etc. are provided to the motor/generator ECU 12. The motor/generator ECU 12 mutually communicates with the engine ECU 1e and the transmission ECU 2e to input, for example, information on operation of the engine 1 as an engine signal ES or information on the gear ratio of the transmission 4 and engagement/release of an engine-brake clutch as a transmission signal TS.

The motor/generator ECU 12 also mutually communicates with the engine ECU 1e to input, for example, information on operation of the engine 1, i.e. throttle opening $T_{vo}$, intake air quantity, air/fuel ratio, ignition timing, and coolant temperature, or on explosion in the engine 1 as engine signal ES. When having engine torque requirement from the motor/generator ECU 12, the engine ECU 1e controls engine torque in accordance with this requirement. The motor/generator revolutions sensor 9 can also detect normal and reverse rotations of the motor/generator 2.

The motor/generator ECU 12 comprises a microcomputer 12e having at least an input-side interface circuit 12a, a central processing unit (CPU) 12b, a memory 12c, and an output-side interface circuit 12d.

Inputted to the input-side interface circuit 12a are the engine-speed detection value $N_{eg}$ out of the engine speed sensor 8, the vehicle-speed detection value $V_{sp}$ out of the vehicle speed sensor 14, the range signal RS out of the inhibitor switch 10, the throttle-opening detection value $T_{vo}$ out of the throttle opening sensor 11, the engine signal ES out of the engine ECU 1e, and the transmission signal TS out of the transmission ECU 2e.

The CPU 12b enters an operating state when providing given power with a key switch, not illustrated, turned on, for example. First, the CPU 12b carries out initialization to turn off not only a drive-duty control signal MS and a generation-duty control signal GS to the motor/generator 2, but also a clutch control signal CS to the direct-coupled clutch 36. Then, referring to FIG. 3, it controls the motor/generator 2 and direct-coupled clutch 36 based on the engine-speed detection value $N_{eg}$, motor/generator-revolutions detection value $N_{mg}$, vehicle-speed detection value $V_{sp}$, range signal RS and throttle-opening detection value $T_{vo}$, and in accordance with processing in FIG. 3. It outputs an engine torque command value to the engine ECU 1e in some cases.

The memory 12c stores in advance a processing program necessary for processing in the CPU 12b, and various data required in the operation process in the CPU 12b.

The output-side interface circuit 12d provides the drive-duty control signal MS, generation-duty control signal GS, and direct-coupled clutch control signal CS or results of operation in the CPU 12b to the motor/generator drive circuit 7 and the solenoid 36a. It is noted that the motor/generator 2 can give braking force to the vehicle by using counter-electromotive force. Braking-torque increasing control of the motor/generator 2 is such that when the motor/generator 2 acts as a generator, the duty ratio of the duty control signal DS to be provided to the chopper 7a of the motor/generator drive circuit 7 is increased to increase counter-electromotive force generated, achieving an increase in braking torque. When the motor/generator 2 acts as a motor, the duty ratio of the duty control signal DS is decreased to decrease drive torque, achieving an increase in braking torque. On the other hand, braking-torque decreasing control of the motor/generator 2 is such that when the motor/generator 2 acts as a generator, the duty ratio of the duty control signal DS is decreased to decrease counter-electromotive force generated, achieving a decrease in braking torque. When the motor/generator 2 acts as a motor, the duty ratio of the duty control signal DS is increased to increase drive torque, achieving a decrease in braking torque.

The following describes various operating states of the engine 1 and motor/generator 2, which are controlled by the motor/generator ECU 12 in accordance with the cruising and operated conditions of the vehicle and the conditions of the accumulator unit.

When the engine 1 is in rotation, and the vehicle is not need to start, i.e. a foot brake is depressed, the accumulator unit 6 including, e.g. a battery is charged using driving force of the engine 1. That is, the motor/generator 2 is used as a generator to generate power.

When selecting the cruising range including drive range D and depressing an accelerator pedal, the engine 1 produces positive-direction torque to gradually obtain normal rotation of the motor/generator 2 while maintaining the engine speed at a target value with the direct-coupled clutch 36 released, giving positive-direction torque to the pinion carrier C to achieve start and acceleration of the vehicle.

When the number of revolutions of the motor/generator 2 comes to agree or roughly agree with a predetermined number of revolutions or target engine speed, or the difference between the engine speed and the number of revolutions of the motor/generator becomes a predetermined value or lower, the direct-coupled clutch 36 is engaged to directly couple the engine 1 with the motor/generator 2, cruising the vehicle. In the cruising state after engagement of the direct-coupled clutch 36, the vehicle runs ordinarily with the motor/generator 2 generating no torque or being in free state and with only the engine 1 generating torque. However, when having larger depression amount of the accelerator pedal and sufficient accumulation quantity in the accumulator unit 6, the motor/generator 2 can generate torque to assist the engine 1.

Contrary to such acceleration cruising, when the vehicle is in deceleration, i.e. the effect of so-called engine brake is expected, the motor/generator 2 is used as a generator, with the direct-coupled clutch 36 engaged, to generate negative-direction torque against road reaction torque inputted from the driving wheels 5, thereby increasing braking force in place of or in addition to engine brake.

Figure 3:
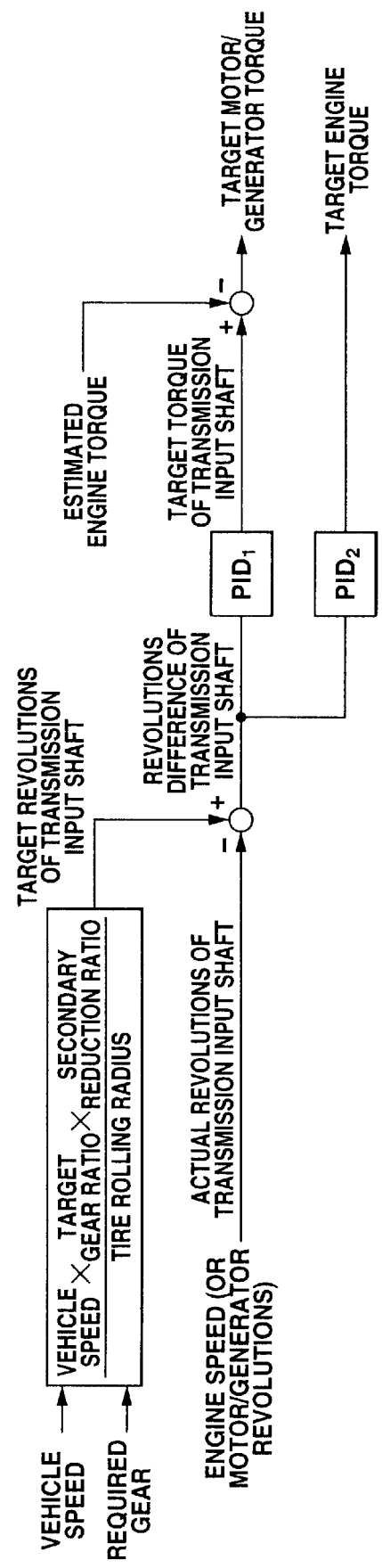
FIG. 3 is a view similar to FIG. 1, showing arithmetic processing for normal torque control executed in a motor/generator ECU.

Referring to FIG. 3, an explanation is made on arithmetic processing performed by the motor/generator ECU 12 for setting a target motor/generator torque and target engine torque in normal cruising. FIG. 3 is a block diagram showing the contents of arithmetic processing. Since a required gear is obtained from the range signal RS out of the inhibitor switch 10, this processing uses the target gear ratio corresponding thereto, which is multiplied by the vehicle speed and further by the secondary reduction ratio or final reduction ratio. A value obtained is divided by the tire rolling radius, obtaining a target number of revolutions of the transmission input shaft. When the direct-coupled clutch 36 is engaged, the input shafts of the engine 1, motor/generator 2, and transmission 4 are maintained in the directly coupled state, so that an actual number of revolutions of the transmission input shaft is equal to the engine speed $N_{eg}$ or the motor/generator revolutions $N_{mg}$. The actual number of revolutions of the transmission input shaft is subtracted from the target number of revolutions thereof, obtaining the difference in revolutions of the transmission input shaft.

The revolutions difference is multiplied by gains of proportional integral derivative (PID) control, obtaining target torque of the transmission input shaft. Since a result obtained by subtracting the estimated engine torque from the transmission input-shaft target torque is a target motor/generator torque, the target motor/generator torque is outputted as a command value. As is known, the estimated engine torque can be calculated through map retrieval with the engine speed $N_{eg}$ as a variable and the throttle opening $T_{vo}$ as a parameter. On the other hand, since the target engine torque can be obtained by multiplying the transmission input-shaft revolutions difference by the gains of individual PID control, it is outputted as a command value if engine torque is controllable.

Figure 4:
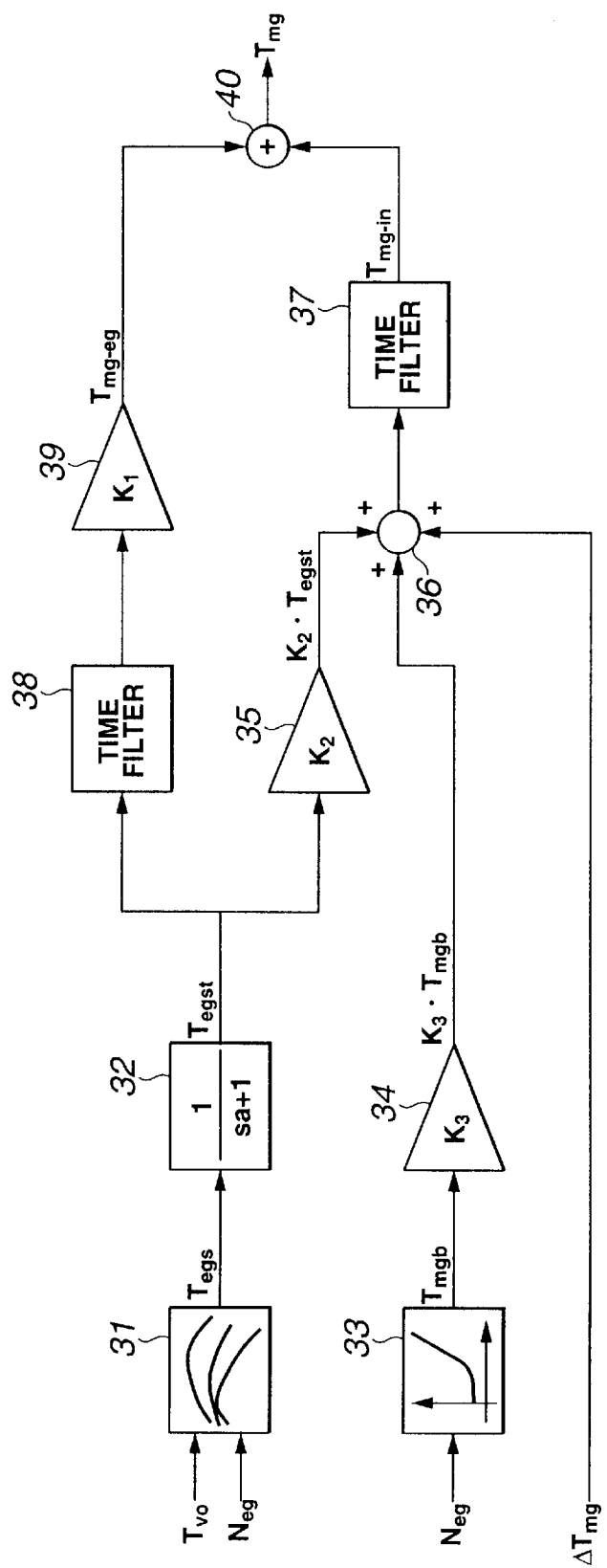
FIG. 4 is a view similar to FIG. 3, showing arithmetic processing for calculation of target motor/generator torque at vehicle starting executed in the motor/generator ECU.

Referring to FIG. 4, of various arithmetic processings executed in the motor/generator ECU 12, the following explains processing for calculating and setting a target motor/generator torque $T_{mg}$, which is executed from depression of the accelerator pedal at vehicle starting to engagement of the direct-coupled clutch 36, and more specifically, to starting of engagement of the direct-coupled clutch 36. In this processing, an estimated engine torque calculating part 31 reads the throttle opening $T_{vo}$ detected by the throttle opening sensor 11 and the engine speed $N_{eg}$ detected by the engine speed sensor 8 to calculate an engine torque $T_{egs}$ through retrieval of a known engine torque map, etc. Then, a first-order lag filter 32 applies first-order lag to the estimated engine torque $T_{egs}$ to calculate an estimated transient engine torque $T_{egst}$. On the other hand, a reference motor/generator torque calculating part 33 reads the engine speed $N_{eg}$ detected by the engine speed sensor 8 to calculate a reference motor/generator torque $T_{mgb}$ through retrieval of a reference motor/generator torque map, etc. Since the reference motor/generator torque $T_{mgb}$ serves to restrain an increase in the engine speed $N_{eg}$ to increase the motor/generator revolutions $N_{mg}$, it is set at a larger value with an increase in the engine speed $N_{eg}$.

Then, an adder 36 sums a value $K_3 \cdot T_{mgb}$ obtained by multiplying the reference motor/generator torque $T_{mgb}$ by a control gain $K_3$ at a multiplier 34, a value $K_2 \cdot T_{egst}$ obtained by multiplying the estimated transient engine torque $T_{egst}$ by a control gain $K_2$ at a multiplier 35, and a motor/generator torque correction amount $\Delta T_{mg}$ calculated through processing in FIG. 5 as will be described later, which is subjected to filtering at a time filter 37 to calculate an independent motor/generator torque $T_{mg-in}$. Here, the time filter 37 is a filter for preventing vibrations from occurring when having variations in torque of the motor/generator 2 itself.

The estimated transient engine torque $T_{egst}$ is subjected to filtering at a time filter 38, which is multiplied by a control gain $K_1$ at a multiplier 39 to calculate a motor/generator torque $T_{mg-eg}$ corresponding to engine torque. Here, the time filter 38 is a filter for preventing vibrations from occurring when having fluctuations in torque of the engine 1. An adder 40 sums the engine torque corresponding motor/generator torque $T_{mg-eg}$ and the independent motor/generator torque $T_{mg-in}$ to calculate the target motor/generator torque $T_{mg}$.

Figure 5:
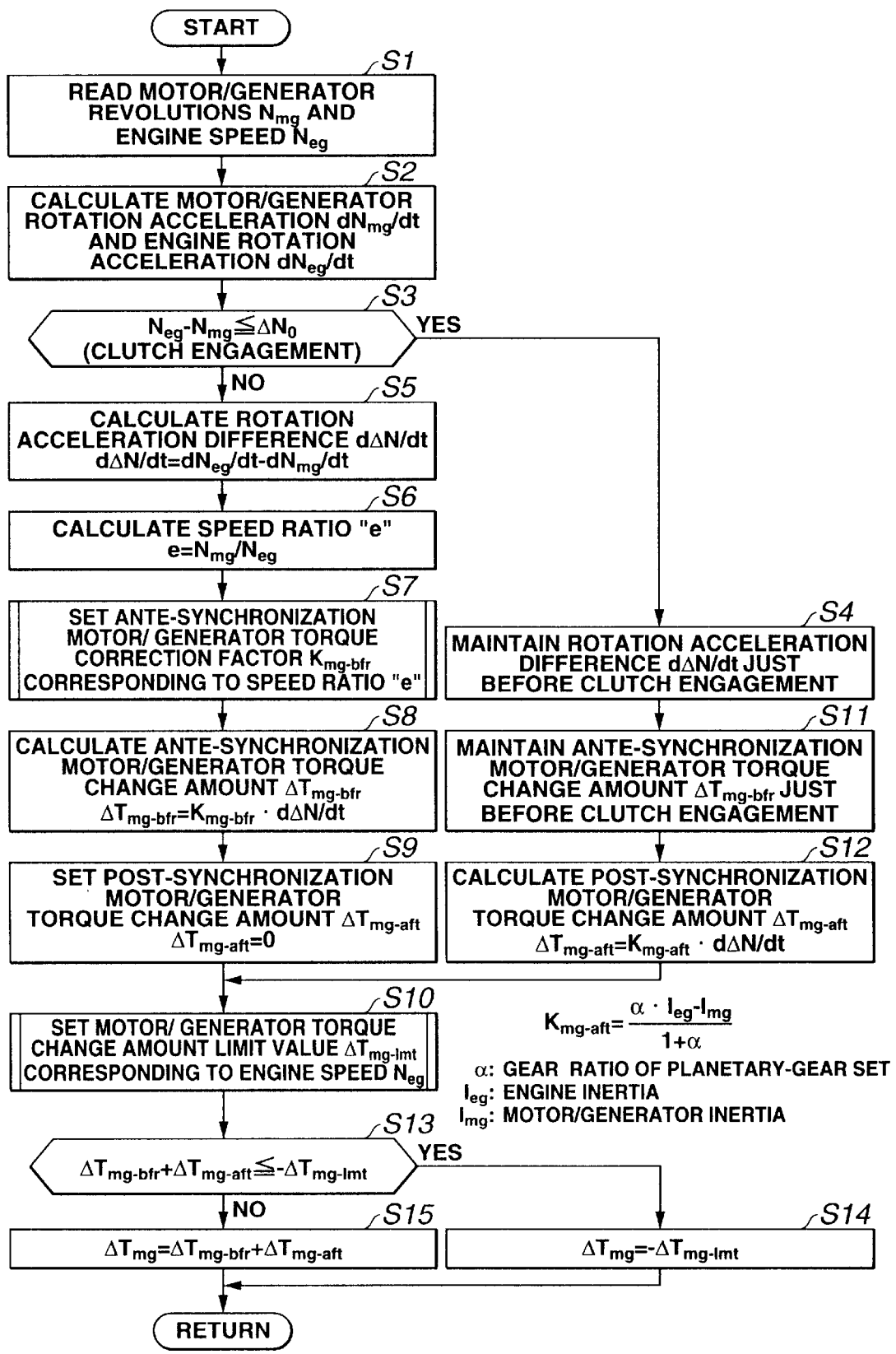
FIG. 5 is a flowchart showing operation of the first embodiment.

Referring next to FIG. 5, an explanation is made on processing for calculating the motor/generator torque correction amount $\Delta T_{mg}$. This processing is executed through timer interruption every predetermined control time $\Delta T$ at the CPU 12b in the motor/generator ECU 2e. Although a flowchart in FIG. 5 fails to provide a communication step, required information or program is read anytime from outside or the memory 12c via the input interface 12a, and information in processing is stored in the memory 12c.

In this processing, first, at a step S1, the CPU 12b reads the motor/generator revolutions $N_{mg}$ detected by the motor/generator revolutions sensor 9 and the engine speed $N_{eg}$ detected by the engine speed sensor 8.

At a subsequent step S2, a motor/generator rotation acceleration $dN_{mg}/dt$ and an engine rotation acceleration $dN_{eg}/dt$ are calculated from a time differential value of the motor/generator revolutions $N_{mg}$ and that of the engine speed $N_{eg}$ which are read at the step S1, respectively.

At a subsequent step S3, it is determined if a value obtained by subtracting the motor/generator revolutions $N_{mg}$ from the engine speed $N_{eg}$ is equal to or smaller than a predetermined value $\Delta N_o$, i.e. if the one-way clutch OWC is engaged. If it is determined that $N_{eg} - N_{mg} \leq \Delta N_o$, flow proceeds to a step S4, whereas if it is determined that $N_{eg} - N_{mg} > \Delta N_o$, flow proceeds to a step S5. It is noted that the predetermined value $N_o$ is substantially zero. That is, in this embodiment, after or slightly before the one-way clutch OWC is directly coupled, flow proceeds to the step S4 and subsequent.

At the step S5, the motor/generator rotation acceleration $dN_{mg}/dt$ is subtracted from the engine rotation acceleration $dN_{eg}/dt$ calculated at the step S2 to calculate a rotation acceleration difference $d\Delta N/dt$, then, flow proceeds to a step S6.

At the step S6, the motor/generator revolutions $N_{mg}$ are divided by the engine speed $N_{eg}$ to calculate the speed ratio "e", then, flow proceeds to a step S7.

Figure 6:
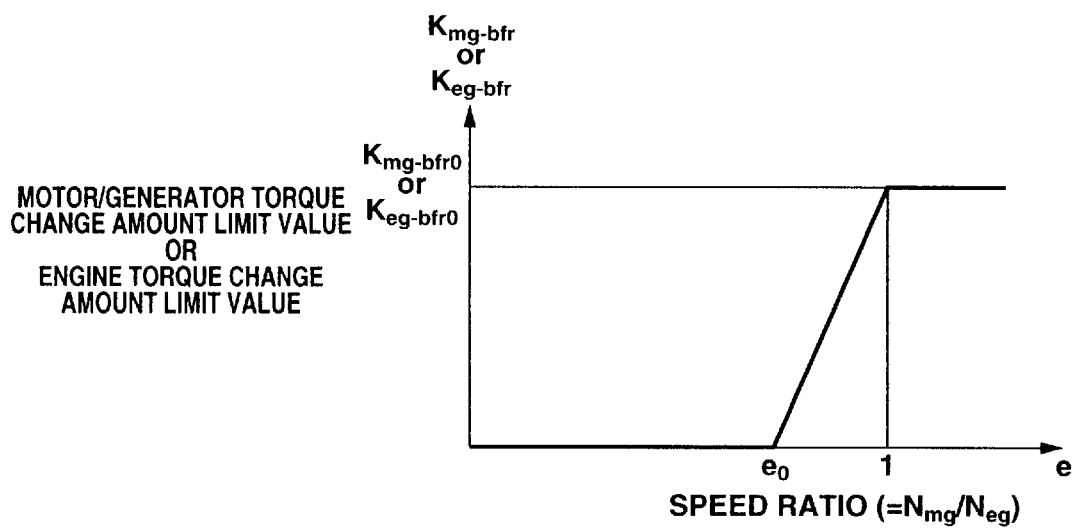
FIG. 6 is a graph showing a control map for setting of an ante-synchronization motor/generator torque correction factor or an ante-synchronization engine torque correction factor in accordance with the speed ratio.

At the step S7, in accordance with individual processing executed at this step, an ante-synchronization motor/generator torque correction factor $K_{mg-bfr}$ corresponding to the speed ratio "e" calculated at the step S6 is calculated and set through retrieval of a control map shown in FIG. 6, etc., then, flow proceeds to a step S8. In this control map, the ante-synchronization motor/generator torque correction factor $K_{mg-bfr}$ is constant at a predetermined value $K_{mg-bfr0}$ in an area where the speed ratio "e" is larger than 1, and is constant at 0 (zero) in an area where the speed ratio "e" is smaller than a predetermined value $e_0$ which is smaller than and close to 1. In the area ranging from the predetermined value $e_0$ to 1, the ante-synchronization motor/generator torque correction factor $K_{mg-bfr}$ is set to increase linearly with an increase in the speed ratio "e". That is, the ante-synchronization motor/generator torque correction factor $K_{mg-bfr}$ is set when the speed ratio "e" is close to 1 and slightly before engagement of the direct-coupled clutch 36.

At the step S8, an ante-synchronization motor/generator torque change amount $\Delta T_{mg-bfr}$ is calculated from the product of the ante-synchronization motor/generator torque correction factor $K_{mg-bfr}$ set at the step S7 and the rotation acceleration difference $d\Delta N/dt$ calculated at the step S5, then, flow proceeds to a step S9.

At the step S9, a post-synchronization motor/generator torque change amount $\Delta T_{mg-aft}$ is set at 0 (zero), then, flow proceeds to a step S10.

At the step S4, the rotation acceleration difference $d\Delta N/dt$ calculated at the step S5 just before clutch engagement is maintained, then, flow proceeds to a step S11.

At the step S11, the ante-synchronization motor/generator torque change amount $\Delta T_{mg-br}$ calculated at the step S8 just before clutch engagement is maintained, then, flow proceeds to a step S12.

At the step S12, the rotation acceleration difference $d\Delta N/dt$ just before clutch engagement which is maintained at the step S4 is multiplied by a post-synchronization motor/generator torque correction factor $K_{mg-aft}$ to calculate a post-synchronization motor/generator torque change amount $\Delta T_{mg-aft}$, then, flow proceeds to the step S10. The post-synchronization motor/generator torque correction factor $K_{mg-aft}$ is expressed by the following formula (1), assuming that the gear ratio of the planetary-gear set 21 is $\alpha$, the engine inertia is $I_{eg}$, and the motor/generator inertia is $I_{mg}$. In this embodiment, assuming that the gear ratio of the planetary-gear set 21 is $\alpha$, the inertia $I_{mg}$ of the motor/generator 2 is smaller than a value obtained by multiplying the inertia $I_{eg}$ of the engine 1 by the gear ratio $\alpha$, so that the post-synchronization motor/generator torque correction factor $K_{mg-aft}$ is always a positive value.

$$K_{mg-aft}=(\alpha \cdot I_{eg}-I_{mg})/(1+\alpha) \qquad (1)$$

Figure 7:
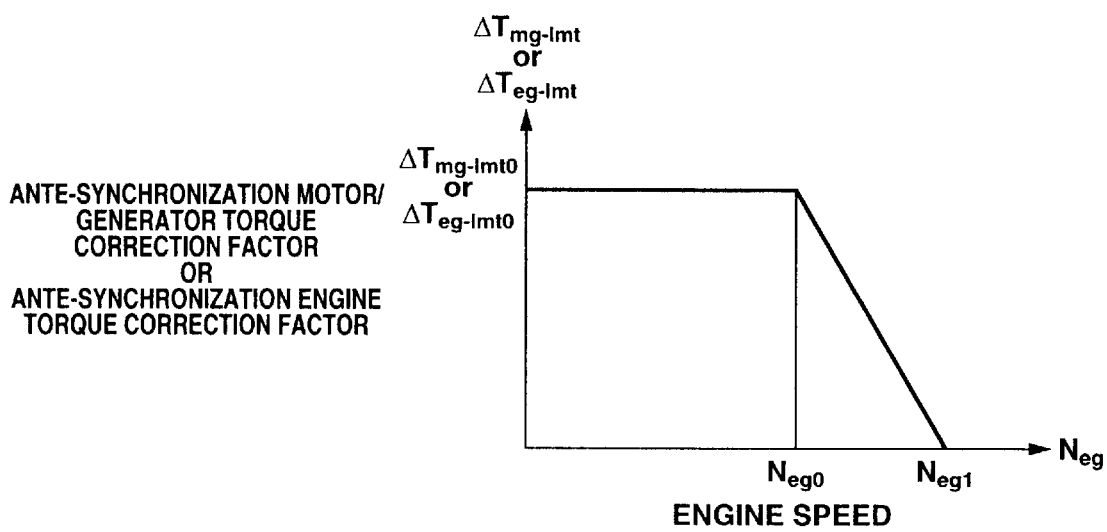
FIG. 7 is a graph similar to FIG. 6, showing a control map for setting of a motor/generator torque change amount limit value or an engine torque change amount limit value in accordance with the engine speed.

At the step S10, in accordance with individual processing executed at this step, a motor/generator torque change amount limit value $\Delta T_{mg-lmt}$ corresponding to the engine speed $N_{eg}$ is calculated and set through retrieval of a control map shown in FIG. 7, etc. In this control map, the motor/generator torque change amount limit value $\Delta T_{mg-lmt}$ is constant at a relatively large predetermined value $\Delta T_{mg-lmt0}$ in an area where the engine speed $N_{eg}$ is smaller than a relatively large predetermined value $N_{eg0}$, and is constant at 0 (zero) in an area where the engine speed $N_{eg}$ is larger than a predetermined value $N_{eg1}$ larger than the predetermined value $N_{eg0}$. In the area ranging from the predetermined value $N_{eg0}$ to the predetermined value $N_{eg1}$, the motor/generator torque change amount limit value $\Delta T_{mg-lmt}$ decreases linearly with an increase in the engine speed $N_{eg}$. That is, in an area where the engine speed $N_{eg}$ is higher, i.e. in a so-called high rotation area, the motor/generator torque change amount limit value $\Delta T_{mg-lmt}$ is set at a small value.

At a subsequent step S13, it is determined if the post-synchronization motor/generator torque change amount ($\Delta T_{mg-bfr}+\Delta T_{mg-aft}$) set at the step S9 or the step S12 is smaller than a negative value ($-\Delta T_{mg-lmt}$) of the motor/generator torque change amount limit value set at the step 10. If it is determined that $\Delta T_{mg-bfr}+\Delta T_{mg-aft} \leq -\Delta T_{mg-lmt}$, flow proceeds to a step S14, whereas if it is determined that $\Delta T_{mg-bfr}+\Delta T_{mg-aft} > -\Delta T_{mg-lmt}$, flow proceeds to a step S15.

At the step S14, the negative value ($-\Delta T_{mg-lmt}$) of the motor/generator torque change amount limit value is set for the motor/generator torque correction amount $\Delta T_{mg}$, then, flow returns to the main program.

At the step S15, the post-synchronization motor/generator torque change amount after $\Delta T_{mg-aft}$ is set for the post-synchronization motor/generator torque change amount $\Delta T_{mg-aft}$ as is, and a value obtained by summing the post-synchronization motor/generator torque change amount $\Delta T_{mg-aft}$ and the ante-synchronization motor/generator torque change amount $\Delta T_{mg-bfr}$ is set for the motor/generator torque correction amount $\Delta T_{mg}$, then, flow returns to the main program.

Thus, according to processings in FIGS. 4 and 5, until the difference between the engine speed $N_{eg}$ and the motor/generator revolutions $N_{mg}$ becomes smaller than the predetermined value $\Delta N_0$ after vehicle starting, i.e. it is assumed that the one-way clutch OWC is engaged completely or roughly, flow of the step S3 to the step S5 and subsequent in FIG. 5 is repeatedly carried out. At the step S5 in FIG. 5, the motor/generator rotation acceleration $dN_{mg}/dt$ is subtracted from the engine rotation acceleration $dN_{eg}/dt$ to calculate the rotation acceleration difference $d\Delta N/dt$. At the subsequent step S6, the motor/generator revolutions $N_{mg}$ are divided by the engine speed $N_{eg}$ to calculate the speed ratio "e". And at the subsequent step S7, the ante-synchronization motor/generator torque correction factor $K_{mg-bfr}$ corresponding to the speed ratio "e" is calculated and set. In the control map in FIG. 6 referred to at the step S7, the ante-synchronization motor/generator torque correction factor $K_{mg-bfr}$ is set when the speed ratio "e" is close to 1 and slightly before engagement of the direct-coupled clutch 36 as mentioned above. At the step S8, therefore, the ante-synchronization motor/generator torque change amount $\Delta T_{mg-bfr}$ calculated out of the product of the motor/generator torque correction factor $K_{mg-bfr}$ and the rotation acceleration difference $d\Delta N/dt$ is set at a larger value as the motor/generator revolutions $N_{mg}$ become closer to the engine speed $N_{eg}$ at vehicle starting and as the motor/generator rotation acceleration $dN_{mg}/dt$ is larger with respect to the engine rotation acceleration $dN_{eg}/dt$.

On the other hand, at the step S9 in FIG. 5, the post-synchronization motor/generator torque change amount $\Delta T_{mg-aft}$ is set at 0 (zero). And at the subsequent step S10, the motor/generator torque change amount limit value $\Delta T_{mg-lmt}$ corresponding to the engine speed $N_{eg}$ is set. The motor/generator torque change amount limit value $\Delta T_{mg-lmt}$ is set at a small value in an area where the engine-speed $N_{eg}$ is higher, i.e. in a so-called high rotation area, as mentioned above. Therefore, when the post-synchronization motor/generator torque change amount ($\Delta T_{mg-bfr}+\Delta T_{mg-aft}$) is smaller than the negative value ($-\Delta T_{mg-lmt}$) of the motor/generator torque change amount limit value, flow proceeds to the step S14 where the negative value ($-\Delta T_{mg-lmt}$) is set for the motor/generator torque correction amount $\Delta T_{mg}$, whereas when the post-synchronization motor/generator torque change amount ($\Delta T_{mg-bfr}+\Delta T_{mg-aft}$) is not smaller than the negative value ($-\Delta T_{mg-lmt}$) of the motor/generator torque change amount limit value, flow proceeds to the step S15 where the post-synchronization motor/generator torque change amount $\Delta T_{mg-aft}$ is set for the post-synchronization motor/generator torque change amount $\Delta T_{mg-aft}$ as is, and a value obtained by summing the post-synchronization motor/generator torque change amount $\Delta T_{mg-aft}$ and the ante-synchronization motor/generator torque change amount $\Delta T_{mg-bfr}$ is set for the motor/generator torque correction amount $\Delta T_{mg}$.

After the difference between the engine speed $N_{eg}$ and the motor/generator revolutions $N_{mg}$ becomes smaller than the predetermined value $\Delta N_0$, i.e. the direct-coupled clutch 36 is engaged completely or roughly, flow of the step S3 to the step S4 and subsequent in FIG. 5 is repeatedly carried out. At the step S4, the rotation acceleration difference $d\Delta N/dt$ just before clutch engagement is maintained. At the subsequent step S11, the ante-synchronization motor/generator torque change amount $\Delta T_{mg-bfr}$ just before clutch engagement is maintained. And at the subsequent step S12, the rotation acceleration difference $d\Delta N/dt$ just before clutch engagement is multiplied by the post-synchronization motor/generator torque correction factor $K_{mg-aft}$ to calculate the post-synchronization motor/generator torque change amount $\Delta T_{mg-aft}$, then, flow proceeds to the step S10. The post-synchronization motor/generator torque change amount $\Delta T_{mg-aft}$ calculated at the step S12 is always a constant value, since the post-synchronization motor/generator torque correction factor $K_{mg-aft}$ is a constant, and the rotation acceleration difference $d\Delta N/dt$ is maintained at a value just before clutch engagement.

In processing in FIG. 4, the motor/generator torque correction amount $\Delta T_{mg}$ thus calculated and set is taken in with the adder 36 to calculate the target motor/generator torque $T_{mg}$. The motor/generator ECU 12 controls operation of the motor/generator 2 to achieve the target motor/generator torque $T_{mg}$.

Figure 8:
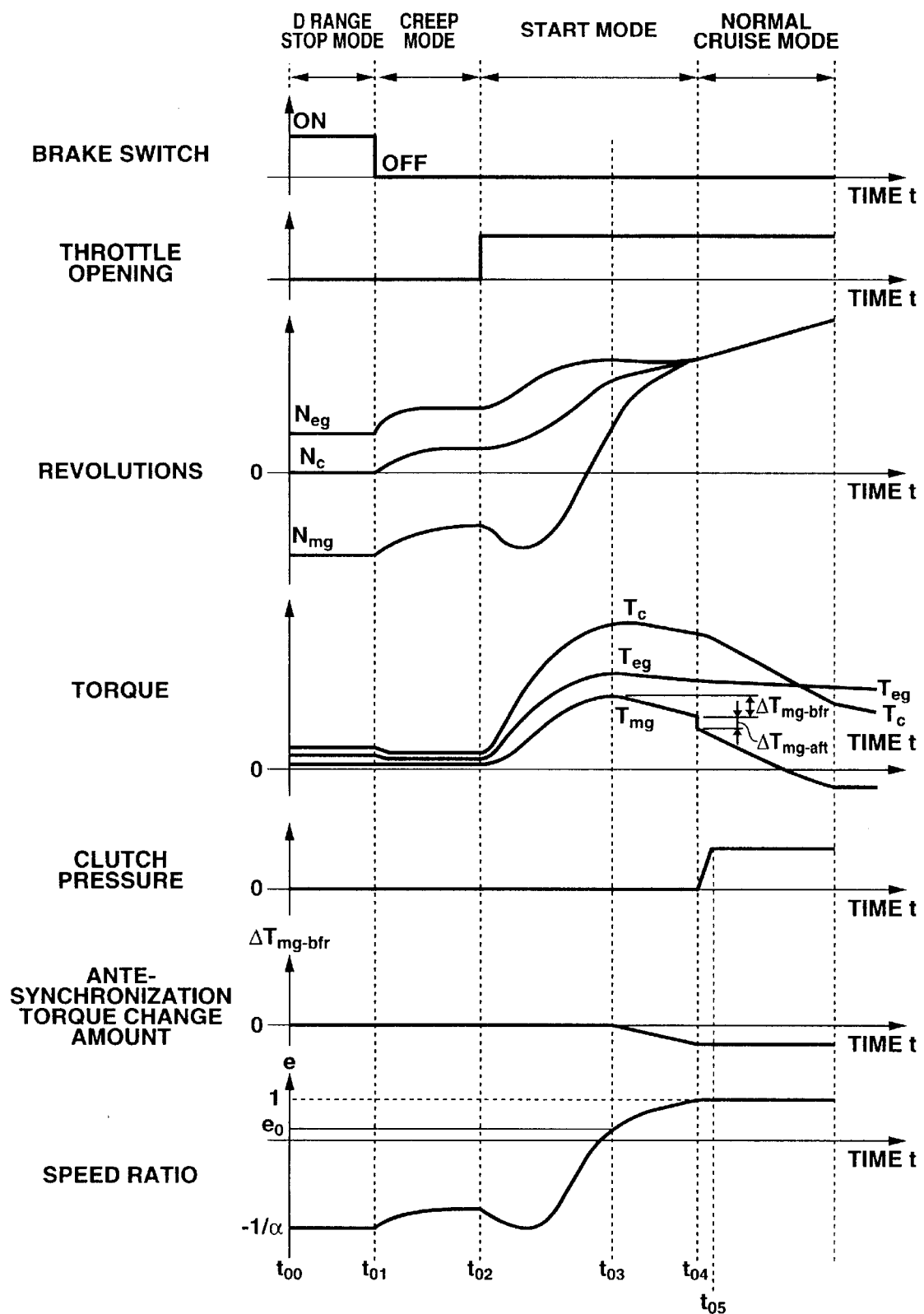
FIG. 8 is a timing chart at vehicle starting showing operation of processings in FIGS. 4 and 5.

Referring next to FIG. 8, operation of this embodiment at vehicle starting will be explained. At time $t_{00}$ in FIG. 8, a brake pedal is still depressed, and the number of revolutions of the input shaft of the transmission 4 or the number of revolutions $N_{eg}$ of the carrier of the planetary-gear set 21 is 0 (zero). The engine 1 rotates at constant engine speed $N_{eg}$ equivalent to idling, and the motor/generator 2 rotates in the negative direction to absorb the engine speed $N_{eg}$ at $1/\alpha$ gear ratio of the planetary-gear set 21. At that time, the throttle opening $T_{vo}$ is fully closed, and the clutch pressure for engaging the direct-coupled clutch 36 is opened into the atmosphere, and the steed ratio "e" is $(-1/\alpha)$. When the motor/generator 2 is not charged, the engine torque $T_{eg}$ is a small positive value corresponding to idling, and thus the carrier torque $T_c$ is loaded at a small positive value (driving force is not generated actually due to brake torque). In the motor/generator 2, the motor/generator torque $T_{mg}$ is generated having a small positive value equivalent to friction. When the motor/generator 2 is charged, the motor/generator torque $T_{mg}$ is torque in the positive direction for charging. On the other hand, the engine 1 generates torque in the positive direction for maintaining idle rotation. As a result, the carrier torque $T_c$ is loaded in the positive direction (no driving force is generated actually due to brake torque).

When the brake pedal is released at time $t_{01}$, the engine speed $N_{eg}$ released from brake torque increases slightly to increase the number of revolutions $N_c$ of the carrier of the planetary-gear set 21 or the number of revolutions of the input shaft of the transmission 4. Thus, the vehicle enters the creep mode to proceed to creep running. With an increase in the engine speed $N_{eg}$ and the carrier revolutions $N_c$, the engine torque $T_{eg}$ and the carrier torque $T_c$ decrease slightly. Accordingly, the motor/generator 2 rotates together with the engine 1 to have the number of revolutions in the negative direction decreased, resulting in the speed ratio "e" slightly increased.

Subsequently, when the accelerator pedal is depressed at time $t_{02}$, the vehicle enters the starting mode to start processings in FIGS. 4 and 5. As mentioned above, it is a feature of the parallel hybrid electric vehicle that when the motor/generator revolutions $N_{mg}$ is small, the motor/generator 2 having excellent torque generation efficiency is positively utilized as a drive source. Thus, after starting, the motor/generator torque $T_{mg}$ is positively increased to restrain an increase in the engine revolution $N_{eg}$, achieving an improvement of fuel consumption. As a result, the motor/generator revolutions $N_{mg}$ increases in the negative direction once, but decreases in the negative direction again with a gradual increase in the engine speed $N_{eg}$ and the engine torque $T_{eg}$. On the other hand, the engine speed $N_{eg}$ is gradually saturated due to the above engine-speed restraining effect, so that the speed ratio "e" decreases once, and then, increases again.

After time $t_{03}$ when the increasing speed ratio "e" becomes larger than a predetermined value $e_0$, at the step S7 in FIG. 5, the positive ante-synchronization motor/generator torque correction factor $K_{mg-bfr}$ is set in accordance with the control map in FIG. 6. Subsequently, the ante-synchronization motor/generator torque correction factor $K_{mg-bfr}$ having gradually increasing value is set with an increase in the speed ratio "e". The engine speed $N_{eg}$ is saturated in the vicinity of time $t_{03}$ as mentioned above, while the motor/generator revolutions $N_{mg}$ continues to increase, so that the motor/generator rotation acceleration $dN_{mg}/dt$ calculated at the step S2 in FIG. 5 is always higher than the engine rotation acceleration $dN_{eg}/dt$, and therefore, the rotation acceleration $d\Delta N/dt$ calculated by subtracting the former from the latter is always a negative value. Moreover, the motor/generator revolutions $N_{mg}$ will be saturated in the course of time, having an absolute value gradually decreased. As a result, in this embodiment, after the time $t_{03}$, the ante-synchronization motor/generator torque change amount $\Delta T_{mg-bfr}$ calculated and set at the step S8 in FIG. 5 is always a negative value having an absolute value gradually increased. As mentioned above, before engagement of the one-way clutch OWC, the post-synchronization motor/generator torque change amount $\Delta T_{mg-aft}$ is always set at 0 (zero), so that the ante-synchronization motor/generator torque change amount $\Delta T_{mg-bfr}$ is set for the motor/generator torque change amount $\Delta T_{mg}$ as is, which is added to obtain the target motor/generator torque $T_{mg}$. Thus, the achieved motor/generator torque $T_{mg}$ decreases gradually. By setting the ante-synchronization motor/generator torque change amount $\Delta T_{mg-bfr}$ in such a way and decreasing slightly, in this embodiment, the motor/generator torque $T_{mg}$, occurrence of vibrations can be restrained at engagement of the one-way clutch OWC.

When the difference between the engine speed $N_{eg}$ and the motor/generator revolutions $N_{mg}$ becomes smaller than the predetermined value $\Delta N_0$ at time $t_{04}$, the engine speed $N_{eg}$, carrier revolutions $N_c$, and motor/generator revolutions $N_{mg}$ are considered to be in synchronization. And the direct-coupled clutch 36 is controlled through individual processing, not illustrated, to raise thereby the clutch pressure, achieving engagement of the direct-coupled clutch 36 at time $t_{05}$. In processing in FIG. 5, after the time $t_{04}$, flow proceeds from the step S3 to the step S4 and subsequent, obtaining maintaining of the rotation acceleration difference $d\Delta N/dt$ just before the clutch engagement and the ante-synchronization motor/generator torque change amount $\Delta T_{mg-bfr}$. On the other hand, at the step S12 in FIG. 5 which is executed at the time $t_{04}$, as mentioned above, the negative post-synchronization rotation acceleration difference $d\Delta N/dt$ just before clutch engagement is multiplied by the positive post-synchronization motor/generator torque correction factor $K_{mg-aft}$ to calculate the negative post-synchronization motor/generator torque change amount $\Delta T_{mg-aft}$. And the negative post-synchronization motor/generator torque change amount $\Delta T_{mg-aft}$ and the negative ante-synchronization motor/generator torque change amount $\Delta T_{mg-bfr}$ are summed to calculate the motor/generator torque change amount $\Delta T_{mg}$. As a result, at the time $t_{04}$, the target motor/generator torque $T_{mg}$ is further decreased by the post-synchronization motor/generator torque change amount $\Delta T_{mg-aft}$. This allows restraint of fluctuations in the carrier torque $T_c$ at or after synchronization through engagement of the one-way clutch OWC, obtaining restrained torsional vibrations in the drive system, resulting in less transfer of discomfort vibrations to the occupant.

Processings in FIGS. 4 and 5 are completed with this motor/generator torque correction control. Subsequently, motor/generator torque is continuously controlled in a gradually decreasing way to drive the vehicle by output of the engine 1.

Figure 9:
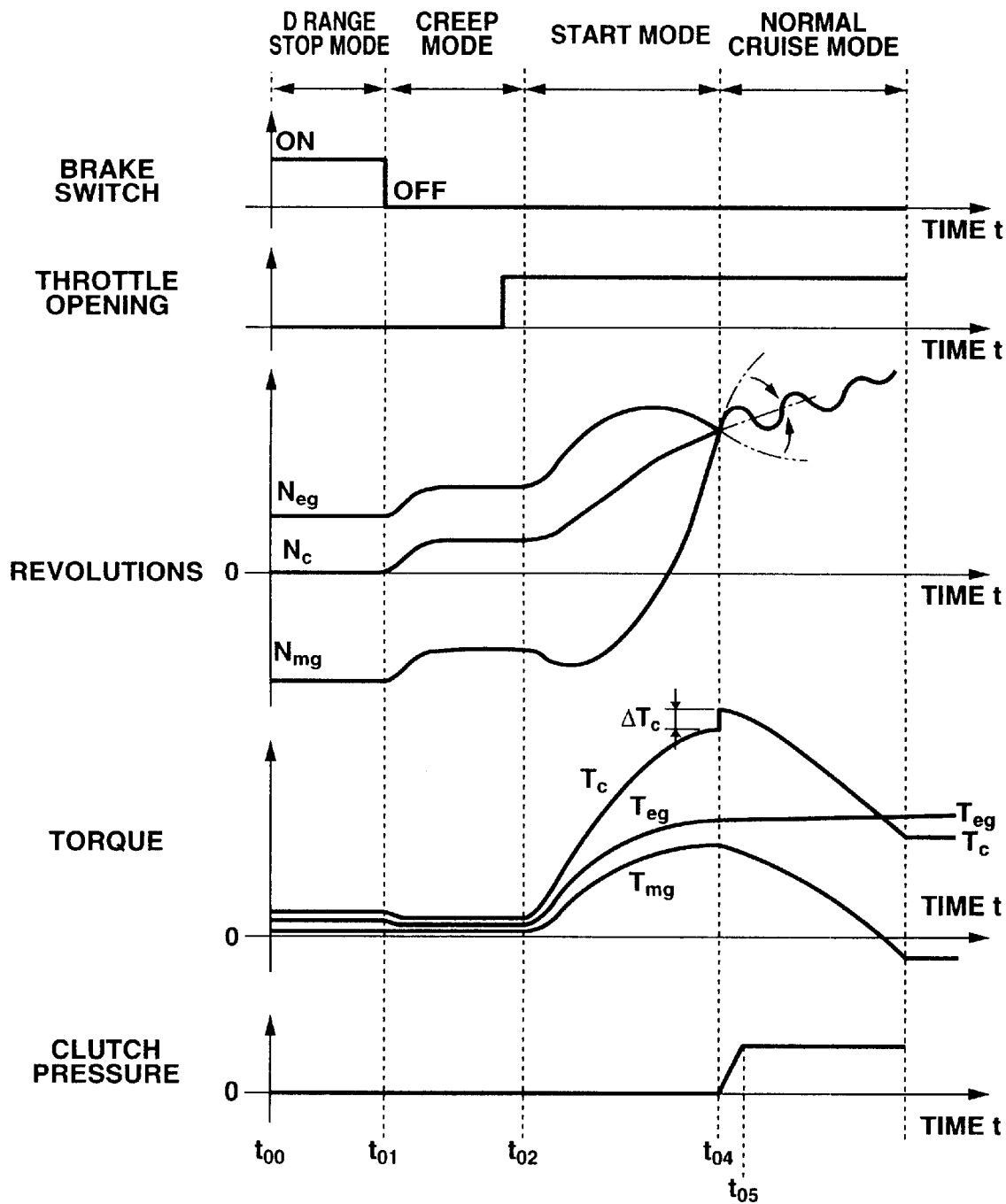
FIG. 9 is a chart similar to FIG. 9, showing operation of processing in the related art.

FIG. 9 shows torque or revolutions fluctuations when only the one-way clutch OWC is engaged without carrying out correction control of motor/generator torque in FIGS. 4 and 5. The time base is provided with the same time as that in FIG. 8. As is apparent from FIG. 9, if the one-way clutch OWC is engaged without carrying out correction control of motor/generator torque, for example, the carrier torque $T_c$ changes abruptly by $\Delta T_c$, in accordance with which the drive-system or carrier revolutions $N_c$ fluctuates, thus inducing vibrations. This is because forcibly synchronizing, for example, the still decreasing engine speed $N_{eg}$ and the still increasing motor/generator revolutions $N_{mg}$ causes torsional vibrations in the drive system, which are transferred as discomfort vibrations to the occupant. Naturally, such vibrations are generated in accordance with the engine rotation acceleration $dN_{eg}/dt$ and the motor/generator rotation acceleration $dN_{mg}/dt$, and more specifically, they are considered to result from torque obtained by subtracting the motor/ generator rotation acceleration $dN_{mg}/dt$ from the engine rotation acceleration $dN_{eg}/dt$.

In this embodiment, assuming that the gear ratio of the planetary-gear set 21 is α, and when the inertia $I_{mg}$ of the motor/generator 2 is smaller than a value obtained by multiplying the inertia $I_{eg}$ of the engine 1 by the gear ratio α, the difference between the engine speed $N_{eg}$ and the motor/generator revolutions $N_{mg}$ becomes smaller than the predetermined value $\Delta N_0$. At engagement of the one-way clutch OWC, the motor/generator torque $T_{mg}$ is decreased by the post-synchronization motor/generator torque change amount $\Delta T_{mg-aft}$, allowing restraint of fluctuations in the carrier torque $T_c$ at or after synchronization, obtaining restrained torsional vibrations in the drive system, resulting in less transfer of discomfort vibrations to the occupant.

In this embodiment, the post-synchronization motor/generator torque change amount $\Delta T_{mg-aft}$ is set in accordance with the engine rotation acceleration $dN_{eg}/dt$ and the motor/generator rotation acceleration $dN_{mg}/dt$ when the difference between the engine speed $N_{eg}$ and the motor/generator revolutions $N_{mg}$ becomes smaller than the predetermined value $\Delta N_0$, i.e. when the one-way clutch OWC is engaged. More specifically, as the rotation acceleration difference $d\Delta N/dt$ between the two is larger, the post-synchronization motor/generator torque change amount $\Delta T_{mg-aft}$ is set at a larger value, allowing more secure restraint of torsional vibrations in the drive system resulting from the rotation acceleration difference $d\Delta N/dt$.

In this embodiment, in the control map in FIG. 7 referred to at the step S10 in FIG. 5, as mentioned above, the motor/generator torque change amount limit value $\Delta T_{mb-lmt}$ is set at a small value in an area where the engine speed $N_{eg}$ is higher, i.e. in a so-called high rotation area. As a result, even if an equivalent post-synchronization motor/generator torque change amount $\Delta T_{mg-aft}$ is set, the ante-synchronization motor/generator torque change amount $\Delta T_{mg-bfr}$ and the post-synchronization motor/generator torque change amount $\Delta T_{mg-aft}$ are replaced with the motor/generator torque change amount limit value $\Delta T_{mg-lmt}$ (to be accurate, its negative value) in the engine high rotation area through processing in FIG. 5. That is, correction of motor/generator torque is prohibited in the engine high rotation area. Before engagement of the one-way clutch OWC, prohibiting motor/generator torque reducing correction in the engine high rotation area allows prevention of the engine speed $N_{eg}$ from being higher, and thus prevention of impossible synchronization with the motor/generator 2. And up to engagement of the direct-coupled clutch 36 after engagement of the one-way clutch OWC, it allows prevention of torque of the engine 1 from being too large or the motor/generator 2 from being too small, and thus prevention of release of the one-way clutch OWC once engaged, facilitating engagement of the direct-coupled clutch 36.

In this embodiment, the direct-coupled clutch 36 is engaged after engagement of the one-way clutch OWC. Alternatively, start of engagement of the direct-coupled clutch 36 can be carried out before engagement of the one-way clutch OWC, for example, which allows gradual reduction in the difference between the engine speed $N_{eg}$ and the motor/generator revolutions $N_{mg}$, leading to effective restraint of occurrence of vibrations resulting from rotation acceleration detection lag, clutch engagement lag, and torque correction response lag. Moreover, in this embodiment, correction of torque of the motor/generator 2 is made before engagement of the one-way clutch OWC. Alternatively, torque correction can be made only at engagement, which allows shortening of time required from vehicle starting to clutch engagement, achieving improved start-ability.

In this embodiment, torque correction is carried out with the motor/generator 2 having smaller inertia and better responsibility than the engine. This allows accurate and fine torque control as compared with torque control with the engine, leading to effective restraint of occurrence of vibrations.

It is noted that processings in FIGS. 4 and 5 constitute means for correcting motor/generator torque, and the control map in FIG. 7 referred to at the step S10 in FIG. 5 constitutes means for prohibiting torque correction.

In the above embodiment, it is determined that the time when the difference between engine speed $N_{eg}$ and the motor/generator revolutions $N_{mg}$ becomes smaller than the predetermined value $\Delta N_0$ is a clutch engaging timing. Optionally, the clutch engaging timing can be determined otherwise, e.g. using the speed ratio "e", wherein clutch engaging control is made when the speed ratio "e" is larger than the predetermined value or close to 1, which can also be used for determination of the clutch engaging timing.

Next, a second embodiment of the present invention will be explained, wherein the method of restraining torsional vibrations in the drive system at synchronization of the engine 1 with the motor/generator 2 through engagement of the one-way clutch OWC includes correction of the motor/generator torque $T_{mg}$ in the same way as in the first embodiment, but wherein assuming that the gear ratio of the planetary-gear set 21 is α, the inertia $I_{mg}$ of the motor/generator 2 is larger than a value obtained by multiplying the inertia $I_{eg}$ of the engine 1 by the gear ratio α. In the second embodiment, processing in FIG. 5 is basically executed like the first embodiment. However, in this embodiment, assuming that the gear ratio of the planetary-gear set 21 is α, the inertia $I_{mg}$ of the motor/generator 2 is larger than a value obtained by multiplying the inertia $I_{eg}$ of the engine 1 by the gear ratio α, so that the post-synchronization motor/generator torque correction factor $K_{mg-aft}$ of the formula (1) calculated at the step S12 in FIG. 5 is always a negative value. The other configurations of the vehicle and differential gear, setting of target motor/generator and engine torques during normal cruising, and arithmetic processing for setting of target motor/generator torque to be carried out at vehicle starting are equivalent to those in the first embodiment.

Figure 10:
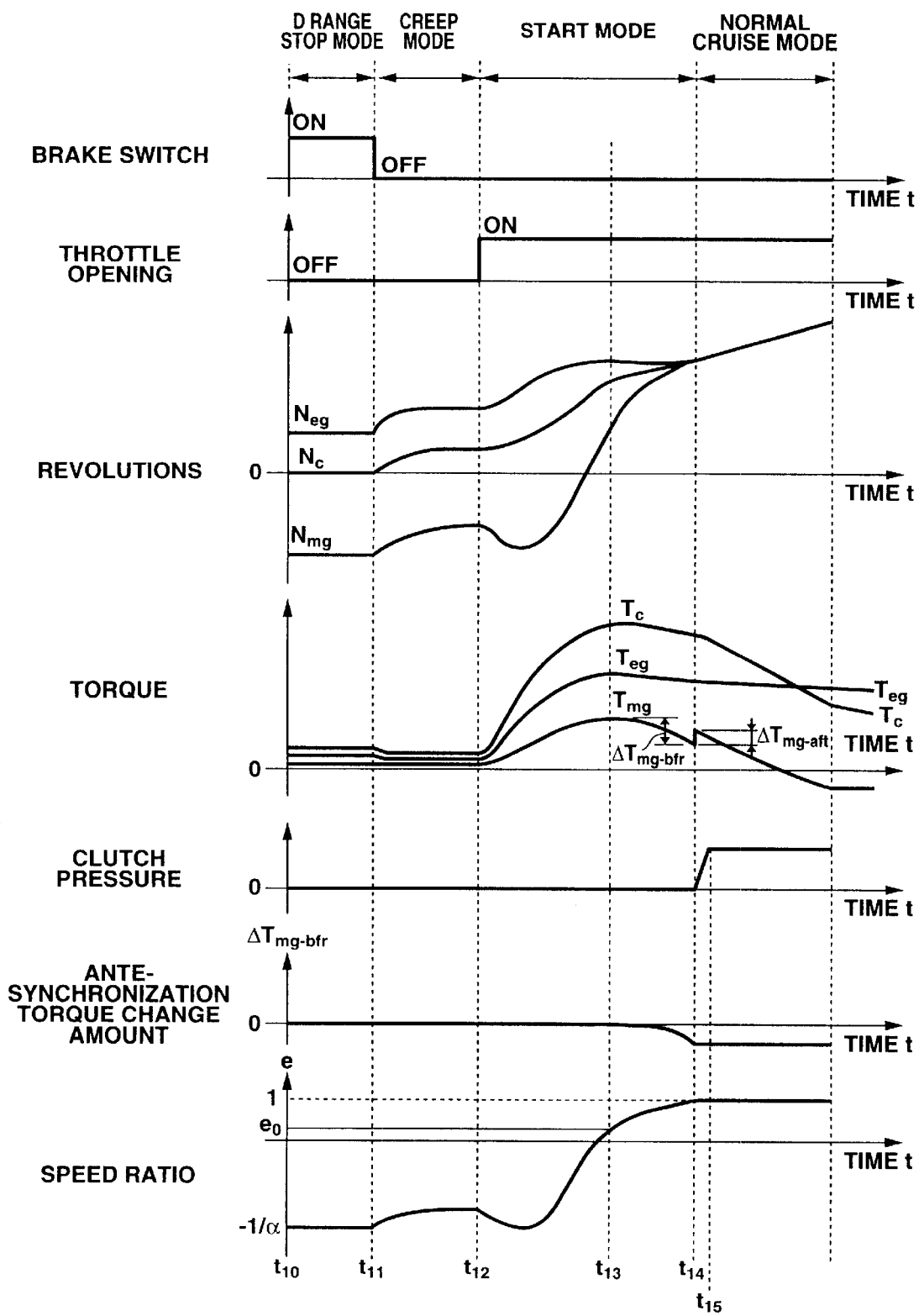
FIG. 10 is a chart similar to FIG. 10, showing a second embodiment.

Referring to FIG. 10, operation of the second embodiment at vehicle starting will be explained. Since operation carried out from time $t_{10}$ to time $t_{13}$ in a timing chart in FIG. 10 is similar to that carried out from the time $t_{00}$ to the time $t_{03}$ in the first embodiment, a detailed explanation thereof is omitted.

After time $t_{13}$ when the increasing speed ratio "e" becomes larger than the predetermined value $e_0$ after time $t_{12}$, at the step S7 in FIG. 5, the positive ante-synchronization motor/generator torque correction factor $K_{mg-bfr}$ is set in accordance with the control map in FIG. 6 in the same way as in the first embodiment. Subsequently, the ante-synchronization motor/generator torque correction factor $K_{mg-bfr}$ having gradually increasing value is set with an increase in the speed ratio "e". After the time $t_{13}$, therefore, the ante-synchronization motor/generator torque change amount $\Delta T_{mg-bfr}$ calculated and set at the step S8 in FIG. 5 is always a negative value in the same way as in the first embodiment, having an absolute value gradually increased. As mentioned above, before engagement of the direct-coupled clutch 36, the post-synchronization motor/generator torque change amount $\Delta T_{mg-aft}$ is always set at 0 (zero), so that the ante-synchronization motor/generator torque change amount $\Delta T_{mg-bfr}$ is set for the motor/ generator torque amount $\Delta T_{mg}$ as is, which is added to obtain the target motor/generator torque $T_{mg}$. Thus, the achieved motor/generator-torque $T_{mg}$ decreases gradually. By setting the ante-synchronization motor/generator torque change amount $\Delta T_{mg-bfr}$ in such a way and by decreasing slightly, in this embodiment, the motor/generator torque $T_{mg}$, engagement of the subsequent one-way clutch OWC can be carried out further smoothly.

When the difference between the engine speed $N_{eg}$ and the motor/generator revolutions $N_{mg}$ becomes smaller than the predetermined value $\Delta N_0$ at time $t_{14}$, the engine speed $N_{eg}$, carrier revolutions $N_c$, and motor/generator revolutions $N_{mg}$ are considered to be in synchronization in the same way as in the first embodiment. And engaging control of the direct-coupled clutch 36 is made through individual processing, not illustrated, to raise thereby the clutch pressure at time $t_{15}$, achieving engagement of the direct-coupled clutch 36. In processing in FIG. 5, after the time $t_{14}$, flow proceeds from the step S3 to the step S4 and subsequent, so that the rotation acceleration difference $d\Delta N/dt$ just before engagement of the one-way clutch OWC and the ante-synchronization motor/generator torque change amount $\Delta T_{mg-bfr}$ are maintained in the same way as in the first embodiment. On the other hand, at the step S12 in FIG. 5 which is executed at the time $t_{14}$, as mentioned above, the negative rotation acceleration difference $d\Delta N/dt$ just before engagement of the one-way clutch OWC is multiplied by the negative post-synchronization motor/generator torque correction factor $K_{mg-aft}$ to calculate the positive post-synchronization motor/generator torque change amount $\Delta T_{mg-aft}$, so that the positive post-synchronization motor/generator torque change amount $\Delta T_{mg-aft}$ and the negative ante-synchronization motor/generator torque change amount $\Delta T_{mg-bfr}$ are summed to calculate the motor/generator torque change amount $\Delta T_{mg}$. As a result, at the time $t_{14}$, the target motor/generator torque $T_{mg}$ is increased by the post-synchronization motor/generator torque change amount $\Delta T_{mg-aft}$. This allows restraint of fluctuations in the carrier torque $T_c$ at or after synchronization through engagement of the one-way clutch OWC, obtaining restrained torsional vibrations in the drive system, resulting in less transfer of discomfort vibrations to the occupant.

Processings in FIGS. 4 and 5 are completed with this motor/generator torque correction control. Subsequently, motor/generator torque is continuously controlled in a gradually decreasing way to drive the vehicle by output of the engine 1.

As mentioned above, in this embodiment, assuming that the gear ratio of the planetary-gear set 21 is α, and when the inertia $I_{mg}$ of the motor/generator 2 is larger than a value obtained by multiplying the inertia $I_{eg}$ of the engine 1 by the gear ratio α, the difference between the engine speed $N_{eg}$ and the motor/generator revolutions $N_{mg}$ becomes smaller than the predetermined value $\Delta N_0$. And at engagement of the one-way clutch OWC, the motor/generator torque $T_{mg}$ is increased by the post-synchronization motor/generator torque change amount $\Delta T_{mg-aft}$, thereby allowing restraint of fluctuations in the carrier torque $T_c$ at or after synchronization through engagement of the one-way clutch OWC, obtaining restrained torsional vibrations in the drive system, resulting in less transfer of discomfort vibrations to the occupant.

In this embodiment, the post-synchronization motor/generator torque change amount $\Delta T_{mg-aft}$ is set in accordance with the engine rotation acceleration $dN_{eg}/dt$ and the motor/generator rotation acceleration $dN_{mg}/dt$ when the difference between the engine speed $N_{eg}$ and the motor/generator revolutions $N_{mg}$ becomes smaller than the predetermined value $\Delta N_0$, i.e. when the one-way clutch OWC is engaged. More specifically, as the rotation acceleration difference $d\Delta N/dt$ between the two is larger, the post-synchronization motor/generator torque change amount $\Delta T_{mg-aft}$ is set at a larger value, allowing more secure restraint of torsional vibrations in the drive system resulting from the rotation acceleration difference $d\Delta N/dt$.

In this embodiment, in the control map in FIG. 7 referred to at the step S10 in FIG. 5, as mentioned above, the motor/generator torque change amount limit value $\Delta T_{mg-lmt}$ is set at a small value in an area where the engine speed $N_{eg}$ is higher, i.e. in a so-called high rotation area. As a result, even if the equivalent post-synchronization motor/generator torque change amount $\Delta T_{mg-aft}$ is set, the ante-synchronization motor/generator torque change amount $\Delta T_{mg-bfr}$ and the post-synchronization motor/generator torque change amount $\Delta T_{mg-aft}$ are replaced with the motor/generator torque change amount limit value $\Delta T_{mg-lmt}$ (to be accurate, its negative value) in the engine high rotation area through processing in FIG. 5. That is, correction of motor/generator torque is prohibited in the engine high rotation area. Prohibiting motor/generator torque reducing correction during engine high rotation allows prevention of the engine speed $N_{eg}$ from being higher, and thus prevention of impossible synchronization with the motor/generator 2 before engagement of the one-way clutch OWC. And up to engagement of the direct-coupled clutch 36 after engagement of the one-way clutch OWC, it allows prevention of torque of the engine 1 from being too large or the motor/generator 2 from being too small, and thus prevention of release of the one-way clutch OWC once engaged, facilitating engagement of the direct-coupled clutch 36.

In this embodiment, the direct-coupled clutch 36 is engaged after engagement of the one-way clutch. Alternatively, start of engagement of the direct-coupled clutch 36 can be carried out before engagement of the one-way clutch OWC, for example, which allows gradual reduction in the difference between the engine speed $N_{eg}$ and the motor/generator revolutions $N_{mg}$, leading to effective restraint of occurrence of vibrations resulting from rotation acceleration detection lag, clutch engagement lag, and torque correction response lag. Moreover, in this embodiment, correction of torque of the motor/generator 2 is made before engagement of the one-way clutch OWC. Alternatively, torque correction can be made only at engagement, which allows shortening of time required from vehicle starting to clutch engagement, achieving improved start-ability.

In this embodiment, torque correction is carried out with the motor/generator 2 having smaller inertia and better responsibility than the engine. This allows accurate and fine torque control as compared with torque control with the engine, leading to effective restraint of occurrence of vibrations.

It is noted that processings in FIGS. 4 and 5 constitute means for correcting motor/generator torque, and the control map in FIG. 7 referred to at the step S10 in FIG. 5 constitutes means for prohibiting torque correction.

In the above embodiment, it is determined that the time when the difference between engine speed $N_{eg}$ and the motor/generator revolutions $N_{mg}$ becomes smaller than the predetermined value $\Delta N_0$ is a clutch engaging timing. Optionally, the clutch engaging timing can be determined otherwise, e.g. using the speed ratio "e", wherein clutch engaging control is made when the speed ratio "e" is larger than the predetermined value or close to 1, which can also be used for determination of the clutch engaging timing.

Next, a third embodiment of the present invention will be explained, wherein correction is made for the engine torque $T_{eg}$ in place of the motor-generator torque $T_{mg}$ in the first and second embodiments. As will be understood from the first and second embodiments, since torsional vibrations in the drive system result from the difference between the engine rotation acceleration $N_{eg}$ or engine torque and the motor/generator rotation acceleration $N_{mg}$ or motor/generator torque, engine torque can be corrected in place of motor/generator torque. The other configurations of the vehicle and differential gear, and arithmetic processing for setting of target motor/generator and engine torques during normal cruising are equivalent to those in the first embodiment. In this embodiment, assuming that the gear ratio of the planetary-gear set 21 is $\alpha$, the inertia $I_{mg}$ of the motor/generator 2 is smaller than a value obtained by multiplying the inertia $I_{eg}$ of the engine 1 by the gear ratio $\alpha$.

Figure 11:
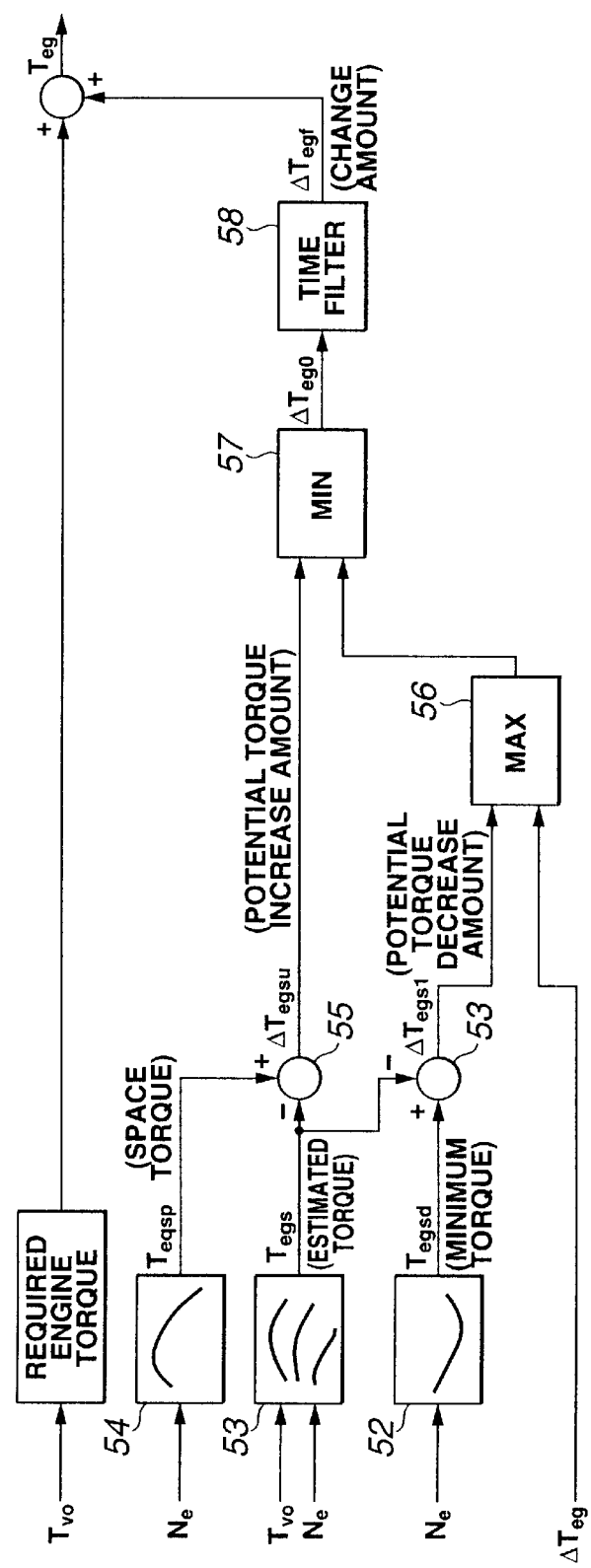
FIG. 11 is a view similar to FIG. 4, showing a third embodiment of the present invention.

In this embodiment, processing for setting target engine torque at vehicle starting is executed with FIG. 11 instead of FIG. 4 in the first embodiment.

Referring to FIG. 11, an estimated engine torque calculating part 51 reads the throttle opening $T_{vo}$ detected by the throttle opening sensor 11 and the engine speed $N_{eg}$ detected by the engine speed sensor 8 to calculate an estimated engine torque $T_{egs}$ through retrieval of a known engine torque map, etc. On the other hand, a full-closed-throttle engine torque calculating part 52 reads the engine speed $N_{eg}$ detected by the engine speed sensor 8 to calculate a minimum torque $T_{egsd}$ through retrieval of the engine torque map, etc. when the throttle opening is full closed. An adder/subtracter 53 subtracts the estimated engine torque $T_{egs}$ from the minimum torque $T_{egsd}$ to calculate a potential engine torque decrease amount $\Delta T_{egsl}$. A maximum-value selector 56 selects larger one of the potential engine torque decrease amount $\Delta T_{egsl}$ and the engine torque correction amount $\Delta T_{eg}$ calculated through processing in FIG. 12 as will be described later.

On the other hand, a full-open-throttle engine torque calculating part 54 reads the engine speed $N_{eg}$ detected by the engine speed sensor 8 to calculate a full-open torque $T_{egsp}$ through retrieval of the engine torque map, etc. when the throttle is full open. An adder/subtracter 55 subtracts the estimated engine torque $T_{egs}$ from the full-open torque $T_{egsp}$ to calculate a potential engine torque increase amount $\Delta T_{egsu}$. A minimum-value selector 57 selects smaller one of the engine torque increase amount $\Delta T_{egsu}$ and the value selected by the maximum-value selector 56 as a reference engine torque correction amount $\Delta T_{eg0}$. The reference engine torque correction amount $\Delta T_{eg0}$ is subjected to filtering at a time filter 58, which is added to a reference required engine torque set in accordance with the throttle opening at the adder, calculating a final required engine torque $T_{eg}$.

Figure 12:
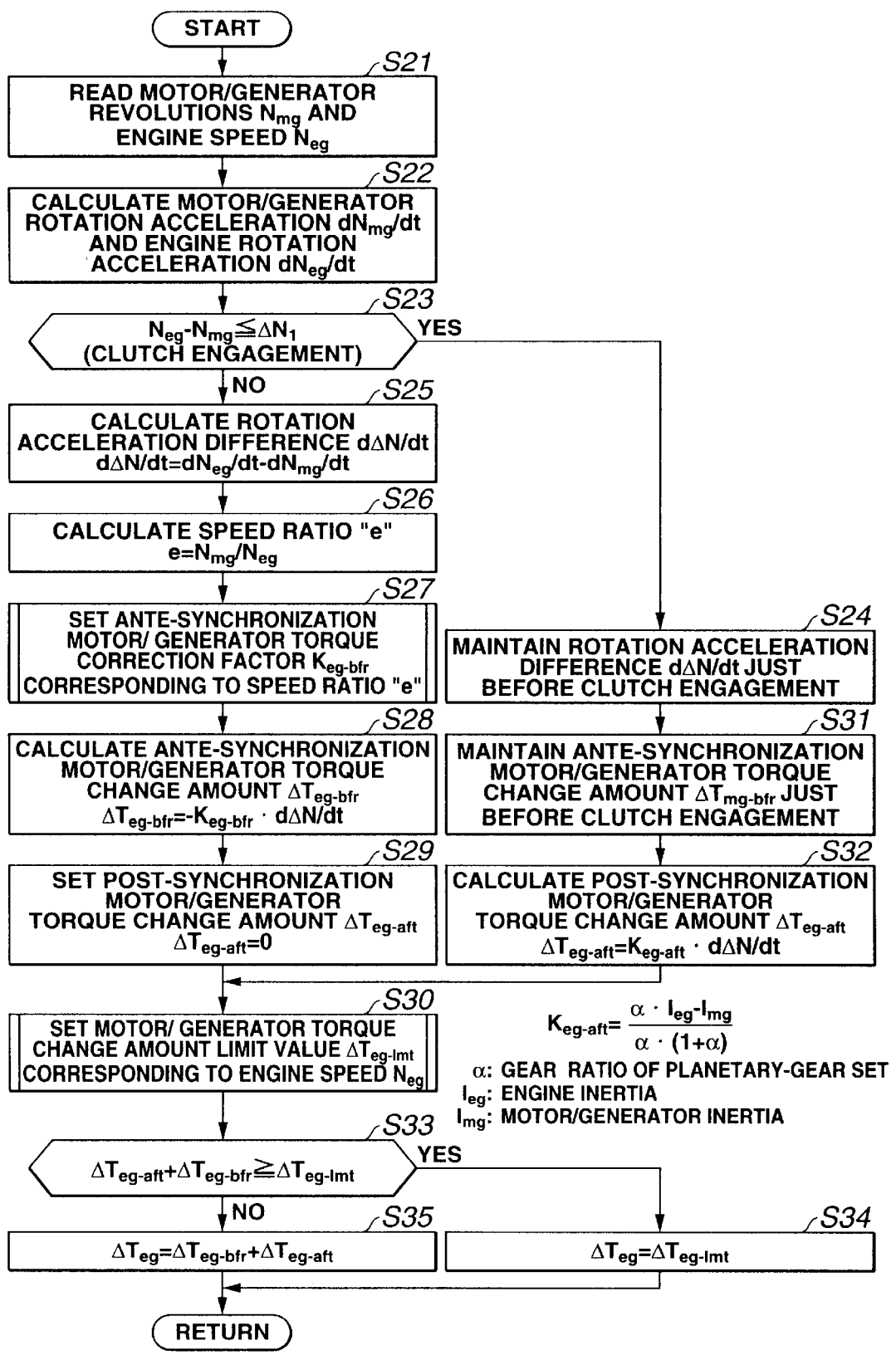
FIG. 12 is a chart similar to FIG. 5, showing operation of the third embodiment of the present invention.

In the third embodiment, processing in FIG. 12 is executed in place of processing in FIG. 5 in the first embodiment. Processing in FIG. 12 is similar to that in FIG. 5, having many equivalent steps. However, in order to avoid confusion, all steps will be explained.

In this embodiment, at a step S21, the CPU reads the motor/generator revolutions $N_{mg}$ detected by the motor/generator revolutions sensor 9 and the engine speed $N_{eg}$ detected by the engine speed sensor 8.

At a subsequent step S22, the motor/generator rotation acceleration $dN_{mg}/dt$ is calculated from a time differential value of the motor/generator revolutions $N_{mg}$ read at the step S21, and the engine rotation acceleration $dN_{eg}/dt$ is calculated from a time differential value of the engine speed $N_{eg}$.

At a subsequent step S23, it is determined if a value obtained by subtracting the motor/generator revolutions $N_{mg}$ from the engine speed $N_{eg}$ is equal to or smaller than a predetermined value $\Delta N_1$, i.e. the revolutions difference between the two is equal to or smaller than a predetermined value to have the one-way clutch OWC being in just before engagement or in engagement. If it is determined that $N_{eg}-N_{mg} \leq \Delta N_1$, i.e. the one-way clutch OWC is in just before engagement or in engagement, flow proceeds to a step S24, whereas if it is determined that $N_{eg}-N_{mg}>\Delta N_1$, flow proceeds to a step S25. The predetermined value $\Delta N_1$ is set at a slightly larger value than the predetermined value $\Delta N_0$, which is roughly 0 (zero), in the first embodiment. That is, in this embodiment, the engine torque $T_{eg}$ is corrected as mentioned above, wherein since the engine torque $T_{eg}$ is lower in response than the motor/generator torque $T_{mg}$, the predetermined value $\Delta N_1$ is set at a slightly larger value to detect an actual clutch engaging timing earlier so as to allow an engine torque correction timing to agree with the actual clutch engaging timing or synchronizing timing between the engine 1 and the motor/generator 2.

At the step S25, the motor/generator rotation acceleration $dN_{mg}/dt$ is subtracted from the engine rotation acceleration $dN_{eg}/dt$ calculated at the step S22 to calculate the rotation acceleration difference $d\Delta N/dt$, then, flow proceeds to a step S26.

At the step S26, the motor/generator revolutions $N_{mg}$ are divided by the engine speed $N_{eg}$ to calculate the speed ratio, then, flow proceeds to a step S27.

At the step S27, in accordance with individual processing executed at this step, the ante-synchronization engine torque correction factor $K_{eg-bfr}$ corresponding to the speed ratio "e" calculated at the step S27 is calculated and set through retrieval of the control map in FIG. 6, etc, then, flow proceeds to a step S28. In this control map, in the same way as in the first embodiment, the predetermined value $K_{eg-bfr0}$ is constant in an area where the speed ratio "e" is larger than 1, and it is constant at 0 (zero) in an area where the speed ratio "e" is smaller than the predetermined value $e_0$ which is smaller than and close to 1. In the area ranging from the ante-synchronization predetermined $e_0$ to 1, the engine torque correction factor $K_{eg-bfr}$ increases linearly with an increase in the speed ratio "e". That is, the ante-synchronization engine torque correction factor $K_{eg-bfr}$ is set when the speed ratio "e" is close to 1 and slightly before engagement of the one-way clutch OWC.

At the step S28, the ante-synchronization engine torque change amount $\Delta T_{eg-bfr}$ is calculated from the product of the negative value $(-K_{eg-bfr})$ of the engine torque correction factor set at the step S27 and the rotation acceleration difference $d\Delta N/dt$ calculated at the step S5, then, flow proceeds to a step S29.

At the step S29, the post-synchronization engine torque change amount $\Delta T_{eg-aft}$ is set at 0 (zero), then, flow proceeds to a step S30.

At the step S24, the rotation acceleration difference $d\Delta N/dt$ calculated at the step S25 just before clutch engagement is maintained, then, flow proceeds to a step S31.

At the step S31, the ante-synchronization engine torque change amount $\Delta T_{eg-bfr}$ calculated at the step S28 just before clutch engagement is maintained, then, flow proceeds to step S32.

At the step S32, the rotation acceleration difference $d\Delta N/dt$ just before engagement of the one-way clutch OWC maintained at the step S24 is multiplied by the post-synchronization engine torque correction factor $K_{eg-aft}$ to calculate the post-synchronization engine torque change amount $\Delta T_{eg-aft}$, then, flow proceeds to the step S30. The post-synchronization engine torque correction factor $K_{eg-aft}$ is expressed by the following formula (2), assuming that the gear ratio of the planetary-gear set 21 is α, the engine inertia is $I_{eg}$ for, and the motor/generator inertia is $I_{mg}$. In this embodiment, assuming that the gear ratio of the planetary-gear set 21 is α, the inertia $I_{mg}$ of the motor/generator 2 is smaller than a value obtained by multiplying the inertia $I_{eg}$ of the engine 1 by the gear ratio α, so that the post-synchronization engine torque correction factor $K_{eg-aft}$ is always a negative value.

$$K_{eg-aft} = -\alpha \cdot (\alpha \cdot I_{eg} - I_{mg})/(\alpha \cdot (1+\alpha)) \quad (2)$$

At the step S30, in accordance with individual processing executed at this step, the engine torque change amount limit value $\Delta T_{eg-Imt}$ corresponding to the engine speed $N_{eg}$ is calculated and set through retrieval of the control map in FIG. 7. In this control map, the engine torque change amount limit value $\Delta T_{eg-Imt}$ is constant at a relatively large predetermined value $\Delta T_{eg-Imt0}$ in an area where the engine speed $N_{eg}$ is smaller than a relatively large predetermined value $N_{eg0}$, and it is constant at 0 (zero) in an area where the engine-speed $N_{eg}$ is a larger predetermined value $N_{eg1}$ than the predetermined value $N_{eg0}$. In the area ranging from the predetermined value $N_{eg0}$ to the predetermined $N_{eg1}$, the engine torque change amount limit value $\Delta T_{eg-Imt}$ decreases linearly with an increase in the engine speed $N_{eg}$. That is, the engine torque change amount limit value $\Delta T_{eg-Imt}$ is set at a small value in an area where the engine speed $N_{eg}$ is higher, i.e. in a so-called high rotation area.

At the step S34, the engine torque change amount limit value $\Delta T_{eg-Imt}$ is set for the engine torque correction amount $\Delta T_{eg}$, then, flow returns to the main program.

At the step S35, the post-synchronization engine torque change amount $\Delta T_{eg-aft}$ is set for the post-synchronization engine torque change amount $\Delta T_{eg-aft}$ as is, and a value obtained by summing the post-synchronization engine torque change amount $\Delta T_{eg-aft}$ and the ante-synchronization engine torque change amount $\Delta T_{eg-bfr}$ is set for the engine torque correction amount $\Delta T_{eg}$, then, flow returns to the main program.

Thus, according to processings in FIGS. 11 and 12, until the difference between the engine speed $N_{eg}$ and the motor/generator revolutions $N_{mg}$ becomes smaller than the predetermined value $\Delta N_1$ after vehicle starting, i.e. it is assumed that the one-way clutch OWC starts to be engaged, flow of the step S23 to the step S25 and subsequent in FIG. 12 is repeatedly carried out. In the same way as in the first embodiment, the rotation acceleration difference dΔN/dt is calculated at the step S25, and the speed ratio "e" is calculated at the subsequent step S26. And the ante-synchronization engine torque correction factor $K_{eg-bfr}$ corresponding to the speed ratio "e" is calculated and set at the subsequent step S27. In the control map in FIG. 6 referred to at the step S27, the ante-synchronization engine torque correction factor $K_{eg-bfr}$ is set when the speed ratio "e" is close to 1 and slightly before engagement of the direct-coupled clutch 36 as mentioned above. At the step S28, therefore, the ante-synchronization engine torque change amount $\Delta T_{eg-bfr}$ calculated out of the product of the negative ante-synchronization engine torque correction factor ($-K_{eg-bfr}$) and the rotation acceleration difference dΔN/dt is set at a larger value as the motor/generator revolutions $N_{mg}$ become closer to the engine speed $N_{eg}$ at vehicle starting and as the motor/generator rotation acceleration $dN_{mg}/dt$ is larger with respect to the engine rotation acceleration $dN_{eg}/dt$.

On the other hand, at the step S29 in FIG. 12, the post-synchronization engine torque change amount $\Delta T_{eg-aft}$ is set at 0 (zero). And at the subsequent step S30, the engine torque change amount limit value $\Delta T_{eg-Imt}$ corresponding to the engine speed $N_{eg}$ is set. The engine torque change amount limit value $\Delta T_{eg-Imt}$ is set at a small value in an area where the engine speed $N_{eg}$ is higher, i.e. in a so-called high rotation area, as mentioned above. Therefore, when the post-synchronization engine torque change amount ($\Delta T_{eg-bfr} + \Delta T_{eg-aft}$) is larger than the engine torque change amount limit value $\Delta T_{eg-Imt}$, flow proceeds to the step 34 where the engine torque change amount limit value $\Delta T_{eg-Imt}$ is set for the engine torque correction amount $\Delta T_{eg}$, whereas when the post-synchronization engine torque change amount ($\Delta T_{eg-bfr} + \Delta T_{eg-aft}$) is not larger than the engine torque change amount limit value $\Delta T_{eg-Imt}$, flow proceeds to the step S35 where the post-synchronization engine torque change amount $\Delta T_{eg-aft}$ is set for the post-synchronization engine torque change amount $\Delta T_{eg-aft}$ as is, and a value obtained by summing the post-synchronization engine torque change amount $\Delta T_{eg-aft}$ and the ante-synchronization engine torque change amount $\Delta T_{eg-bfr}$ is set for the engine torque correction amount $\Delta T_{eg}$.

After the difference between the engine speed $N_{eg}$ and the motor/generator revolutions $N_{mg}$ becomes smaller than the predetermined value $\Delta N_1$, i.e. it is assumed that the direct-coupled clutch 36 starts to be engaged, flow of the step S23 to the step S24 and subsequent in FIG. 12 is repeatedly carried out. At the step S24, the rotation acceleration difference dΔN/dt just before engagement of the one-way clutch OWC is maintained. At the subsequent step S31, the ante-synchronization engine torque change amount $\Delta T_{eg-bfr}$ just before clutch engagement is maintained. And at the subsequent step S32, the rotation acceleration difference dΔN/dt just before clutch engagement is multiplied by the post-synchronization engine torque correction factor $K_{eg-aft}$ to calculate the post-synchronization engine torque change amount $\Delta T_{eg-aft}$, then, flow proceeds to the step S30. The post-synchronization engine torque change amount $\Delta T_{eg-aft}$ calculated at the step S32 is always a constant value, since the post-synchronization engine torque correction factor $K_{eg-aft}$ is a constant, and the rotation acceleration difference dΔN/dt is maintained at a value just before clutch engagement.

In processing in FIG. 11, the engine torque correction amount $\Delta T_{eg}$ thus calculated and set is taken in with the adder to calculate the target engine torque $T_{eg}$. The engine ECU 1e controls operation of the engine 1 to achieve the target engine torque $T_{eg}$.

Figure 13:
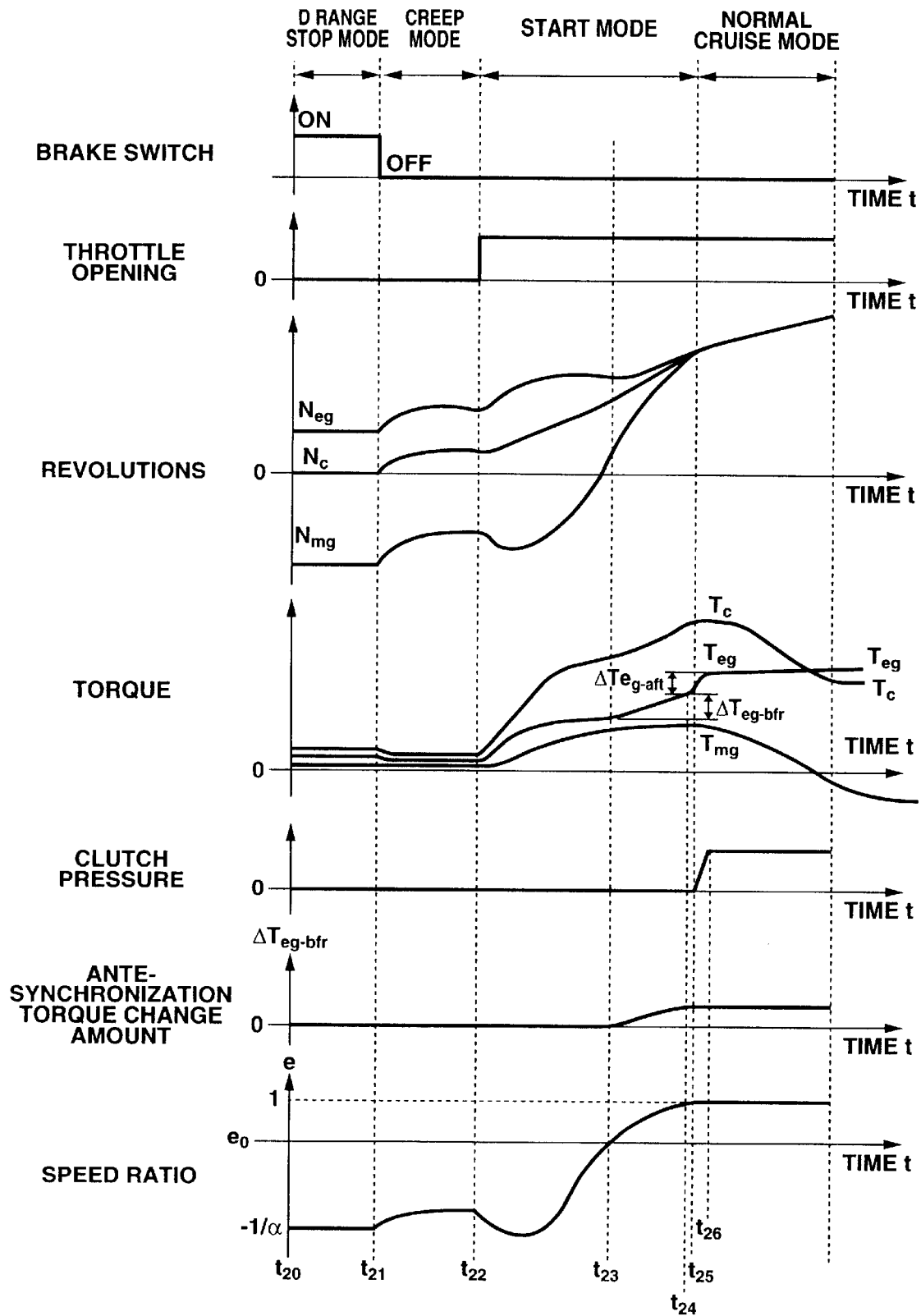
FIG. 13 is a chart similar to FIG. 10, showing operation of processing in FIGS. 11 and 12.

Referring next to FIG. 13, operation of this embodiment at vehicle starting will be explained. Since operation carried out from time $t_{20}$ to time $t_{23}$ in a timing chart in FIG. 13 is similar to that carried out from time $t_{00}$ to time $t_{03}$ in the first embodiment except that the target engine torque $T_{eg}$ as set is different, a detailed explanation thereof is omitted.

After time $t_{22}$ when the increasing speed ratio "e" becomes larger than the predetermined value $e_0$ after time $t_{22}$, at the step S27 in FIG. 12, the positive ante-synchronization engine torque correction factor $K_{eg-bfr}$ is set in accordance with the control map in FIG. 6. Subsequently, the ante-synchronization engine torque correction factor $K_{eg-bfr}$ having gradually increasing value is set with an increase in the speed ratio "e". The engine speed $N_{eg}$ is saturated in the vicinity of time $t_{23}$, while the motor/generator revolutions $N_{mg}$ continues to increase, so that the motor/generator rotation acceleration $dN_{mg}/dt$ calculated at the step S22 in FIG. 12 is always higher than the engine rotation acceleration $dN_{eg}/dt$, and therefore, the rotation acceleration $d\Delta N/dt$ calculated by subtracting the former from the latter is always a negative value. Moreover, the motor/generator revolutions $N_{mg}$ will be saturated in the course of time, having an absolute value gradually decreased. Therefore, the ante-synchronization engine torque change amount $\Delta T_{eg-bfr}$ calculated and set at the step S28 in FIG. 12 out of the product of the negative ante-synchronization engine torque correction factor $(-K_{eg-bfr})$ and the rotation acceleration $d\Delta N/dt$ is always a positive value having an absolute value gradually increased. As mentioned above, before engagement of the one-way clutch OWC, the post-synchronization engine torque change amount $\Delta T_{eg-aft}$ is always set at 0 (zero), so that the ante-synchronization engine torque change amount $\Delta T_{eg-bfr}$ is set for the engine torque change amount $\Delta T_{eg}$ as is, which is added to obtain the target engine torque $T_{eg}$. Thus, the achieved engine torque $T_{eg}$ increases gradually. By setting the ante-synchronization engine torque change amount $\Delta T_{eg-bfr}$ in such a way and decreasing slightly, in this embodiment, the engine torque $T_{eg}$, occurrence of vibrations can be further restrained at engagement of the one-way clutch OWC.

When the difference between the engine speed $N_{eg}$ and the motor/generator revolutions $N_{mg}$ becomes smaller than the predetermined value $\Delta N_1$ at time $t_{24}$, it is determined that the one-way clutch OWC is in just before engagement, flow proceeds from the step S23 to the step S24 and subsequent, so that the rotation acceleration difference $d\Delta N/dt$ just before clutch engagement and the ante-synchronization engine torque change amount $\Delta T_{eg-bfr}$ are maintained. On the other hand, at the step S32 in FIG. 12 which is executed at the time $t_{24}$, as mentioned above, the negative ante-synchronization rotation acceleration difference $d\Delta N/dt$ just before clutch engagement is multiplied by the negative post-synchronization engine torque correction factor $K_{eg-aft}$ to calculate the positive post-synchronization engine torque change amount $\Delta T_{eg-aft}$. And the positive post-synchronization engine torque change amount $\Delta T_{eg-aft}$ and the positive ante-synchronization engine torque change amount $\Delta T_{eg-bfr}$ are summed to calculate the engine torque change amount $\Delta T_{eg}$. As a result, after the time $t_{24}$, the target engine torque $T_{eg}$ is gradually increased by the post-synchronization engine torque change amount $\Delta T_{eg-aft}$ (depending on the response characteristic of the engine 1). This allows restraint of fluctuations in the carrier torque $T_c$ at or after synchronization, obtaining restrained torsional vibrations in the drive system, resulting in less transfer of discomfort vibrations to the occupant.

Processings in FIGS. 11 and 12 are completed with this engine torque correction control. Subsequently, motor/generator torque is continuously controlled in a gradually decreasing way to drive the vehicle by output of the engine 1. At time $t_{25}$ later than the time $t_{24}$, engagement of the direct-coupled clutch 36 is controlled through individual processing, not illustrated, resulting in raised clutch pressure for engagement of the direct-coupled clutch 36 at time $t_{26}$.

As mentioned above, in this embodiment, assuming that the gear ratio of the planetary-gear set 21 is α, and when the inertia $I_{mg}$ of the motor/generator 2 is smaller than a value obtained by multiplying the inertia $I_{eg}$ of the engine 1 by the gear ratio α, the difference between the engine speed $N_{eg}$ and the motor/generator revolutions $N_{mg}$ becomes smaller than the predetermined value $\Delta N_1$, and when the one-way clutch OWC is engaged, the engine torque $T_{mg}$ is increased by the post-synchronization engine torque change amount $\Delta T_{eg-aft}$, thereby allowing restraint of fluctuations in the carrier torque $T_c$ at or after synchronization due to engagement of the one-way clutch OWC, obtaining restrained torsional vibrations in the drive system, resulting in less transfer of discomfort vibrations to the occupant.

In this embodiment, the post-synchronization engine torque change amount $\Delta T_{eg-aft}$ is set in accordance with the engine rotation acceleration $dN_{eg}/dt$ and the motor/generator rotation acceleration $dN_{mg}/dt$ when the difference between the engine speed $N_{eg}$ and the motor/generator revolutions $N_{mg}$ becomes smaller than the predetermined value $\Delta N_1$, i.e. when the one-way clutch OWC starts to be engaged. More specifically, as the rotation acceleration difference $d\Delta N/dt$ between the two, the post-synchronization engine torque change amount $\Delta T_{eg-aft}$ is set at a larger value, allowing more secure restraint of torsional vibrations in the drive system resulting from the rotation acceleration difference $d\Delta N/dt$.

In this embodiment, in the control map in FIG. 7 referred to at the step S30 in FIG. 12, as mentioned above, the engine torque change amount limit value $\Delta T_{eg-lmt}$ is set at a small value in an area where the engine speed $N_{eg}$ is higher, i.e. in a so-called high rotation area. As a result, even if the engine torque change amount $(\Delta T_{eg-bfr}+\Delta T_{eg-aft})$ is set, the engine torque change amount $\Delta T_{eg}$ is replaced with the engine torque change amount limit value $\Delta T_{eg-lmt}$ in the engine high rotation area through processing in FIG. 12. That is, in the engine high rotation area, correction of increasing engine torque is prohibited. Prohibiting engine torque increasing correction during engine high rotation allows prevention of the engine speed $N_{eg}$ from being higher, and thus prevention of impossible synchronization with the motor/generator 2 before engagement of the one-way clutch OWC. And up to engagement of the direct-coupled clutch 36 after engagement of the one-way clutch OWC, it allows prevention of torque of the engine 1 from being too large or the motor/generator 2 from being too small, and thus prevention of release of the one-way clutch OWC once engaged, facilitating engagement of the direct-coupled clutch 36.

In this embodiment, the direct-coupled clutch 36 is engaged after engagement of the one-way clutch OWC. Alternatively, start of engagement of the direct-coupled clutch 36 can be carried out before the one-way clutch OWC, for example, which allows gradual reduction in the difference between the engine speed $N_{eg}$ and the motor/generator revolutions $N_{mg}$, leading to effective restraint of occurrence of vibrations resulting from rotation acceleration detection lag, clutch engagement lag, and torque correction response lag. Moreover, in this embodiment, correction of torque of the motor/generator 2 is made before engagement of the one-way clutch OWC. Alternatively, torque correction can be made only at engagement, which allows shortening of time required from vehicle starting to clutch engagement, achieving improved start-ability.

It is noted that processings in FIGS. 11 and 12 constitute means for correcting motor/generator torque, and the control map in FIG. 7 referred to at the step S30 in FIG. 12 constitutes means for prohibiting torque correction.

In the above embodiment, also, it is determined that the time when the difference between the engine speed $N_{eg}$ and the motor/generator $N_{mg}$ becomes smaller than the predetermined value $\Delta N_1$ is a clutch engaging timing. Optionally, the clutch engaging timing can be determined otherwise, e.g. using the speed ratio "e", wherein clutch engaging control is made when the speed ratio "e" is larger than the predetermined value or close to 1, which can also be used for determination of the clutch engaging timing.

Next, a fourth embodiment of the present invention will be explained, wherein the method of restraining torsional vibrations in the drive system at synchronization of the engine 1 with the motor/generator 2 through engagement of the one-way clutch OWC includes correction of the engine torque $T_{eg}$ in the same way as in the third embodiment, but wherein assuming that the gear ratio of the planetary-gear set 21 is α, the inertia $I_{mg}$ of the motor/generator 2 is larger than a value obtained by multiplying the inertia $I_{eg}$ of the engine 1 by the gear ratio α. In the fourth embodiment, processing in FIG. 12 is basically executed like the third embodiment. However, in this embodiment, assuming that the gear ratio of the planetary-gear set 21 is α, the inertia $I_{mg}$ of the motor/generator 2 is larger than a value obtained by multiplying the inertia $I_{eg}$ of the engine 1 by the gear ratio α, so that the post-synchronization motor/generator torque correction factor $K_{mg-aft}$ of the formula (2) calculated at the step S32 in FIG. 12 is always a positive value. The other configurations of the vehicle and differential gear, setting of target motor/generator and engine torques during normal cruising, and arithmetic processing for setting of target motor/generator torque to be carried out at vehicle starting are equivalent to those in the third embodiment.

Figure 14:
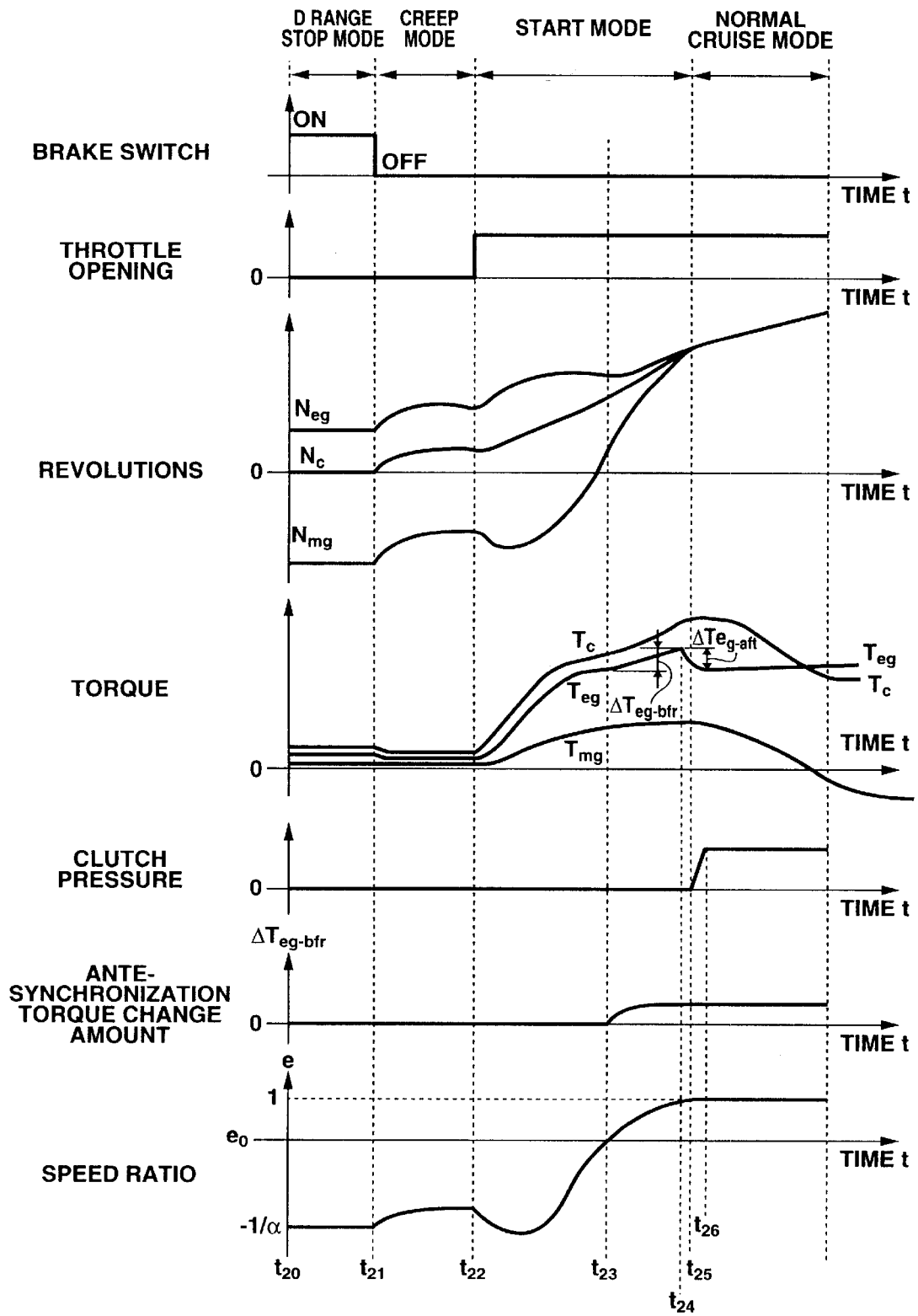
FIG. 14 is a chart similar to FIG. 13, showing a fourth embodiment of the present invention.

Referring to FIG. 14, operation of the fourth embodiment at vehicle starting will be explained. Since operation carried out time $t_{30}$ to time $t_{33}$ in a timing chart in FIG. 14 is similar to that carried out from the time $t_{00}$ to the time $t_{03}$ in the first embodiment except that the target engine torque $T_{eg}$ as set is different, a detailed explanation thereof is omitted. After the time $t_{33}$ when the increasing speed ratio "e" becomes larger than the predetermined value $e_0$ after the time $t_{32}$, at a step S27 in FIG. 12, a positive ante-synchronization engine torque correction factor $K_{eg-bfr}$ is set in accordance with the control map in FIG. 6. Subsequently, the ante-synchronization engine torque correction factor $K_{eg-bfr}$ having gradually increasing value is set with an increase in the speed ratio "e". Therefore, as mentioned above, the ante-synchronization engine torque change amount $\Delta T_{eg-bfr}$ calculated and set out of the product of the negative ante-synchronization engine torque correction factor $(-K_{eg-bfr})$ and the rotation acceleration $d\Delta N/dt$ at the step S28 in FIG. 12 after the time $t_{33}$ is always a positive value having an absolute value gradually increased. As mentioned above, before engagement of the one-way clutch OWC, the post-synchronization engine torque change amount $\Delta T_{eg-aft}$ is always set at 0 (zero), so that the ante-synchronization engine torque change amount $\Delta T_{eg-bfr}$ is set for the engine torque change amount $\Delta T_{eg}$ as is, which added to set the target engine torque $T_{eg}$. Thus, the achieved engine torque $T_{eg}$ increases gradually. By setting the ante-synchronization engine torque change amount $\Delta T_{eg-bfr}$ in such a way and increasing slightly, in this embodiment, the engine torque $T_{eg}$, occurrence of vibrations can be restrained at engagement of the subsequent one-way clutch OWC.

When the difference between the engine speed $N_{eg}$ and the motor/generator revolutions $N_{mg}$ becomes smaller than the predetermined value $\Delta N_1$ at time $t_{34}$, it is determined in processing in FIG. 12 that the one-way clutch is in just before engagement, and flow proceeds from the step S23 to the step S24 and subsequent. Thus, the rotation acceleration difference $d\Delta N/dt$ just before clutch engagement and the ante-synchronization engine torque change amount $\Delta T_{eg-bfr}$ are maintained. On the other hand, at the step S32 in FIG. 12 which is executed at time $t_{34}$, as mentioned above, the negative rotation acceleration difference $d\Delta N/dt$ just before engagement of the one-way clutch OWC is multiplied by the positive post-synchronization engine torque correction factor $K_{eg-aft}$ to calculate the negative post-synchronization engine torque change amount $\Delta T_{eg-aft}$. And the negative post-synchronization engine torque change amount $\Delta T_{eg-aft}$ and the positive ante-synchronization engine torque change amount $\Delta T_{eg-bfr}$ are summed to calculate the engine torque change amount $\Delta T_{eg}$. As a result, after the time $t_{34}$, the target engine torque $T_{eg}$ is gradually decreased by the post-synchronization engine torque change amount $\Delta T_{eg-aft}$ (depending on the response characteristic of the engine 1). This allows restraint of fluctuations in the carrier torque $T_c$ at or after synchronization, obtaining restrained torsional vibrations in the drive system, resulting in less transfer of discomfort vibrations to the occupant.

Processings in FIGS. 11 and 12 are completed with this engine torque correction control. Subsequently, motor/generator torque is continuously controlled in a gradually decreasing way to drive the vehicle by output of the engine 1. At time $t_{35}$ later than the time $t_{34}$, engagement of the direct-coupled clutch 36 is controlled through individual processing, not illustrated, resulting in raised clutch pressure for engagement of the direct-coupled clutch 36 at time $t_{36}$.

In this embodiment, assuming that the gear ratio of the planetary-gear set 21 is α, and when the inertia $I_{mg}$ of the motor/generator 2 is larger than a value obtained by multiplying the inertia $I_{eg}$ of the engine 1 by the gear ratio α, the difference between the engine speed $N_{eg}$ and the motor/generator revolutions $N_{mg}$ becomes smaller than the predetermined value $\Delta N_1$, so that the direct-coupled clutch 36 starts to be engaged. At that time, the engine torque $T_{mg}$ is decreased by the post-synchronization engine torque change amount $\Delta T_{eg-aft}$, thus allowing restraint of fluctuations in the carrier torque $T_c$ at or after synchronization, obtaining restrained torsional vibrations in the drive system, resulting in less transfer of discomfort vibrations to the occupant.

In this embodiment, in the same way as in the third embodiment, the post-synchronization engine torque change amount $\Delta T_{eg-aft}$ is set in accordance with the engine rotation acceleration $dN_{eg}/dt$ and the motor/generator rotation acceleration $dN_{mg}/dt$ when the difference between the engine speed $N_{eg}$ and the motor/generator revolutions $N_{mg}$ becomes smaller than the predetermined value $\Delta N_1$, i.e. when the direct-coupled clutch 36 starts to be engaged. More specifically, as the rotation acceleration difference $d\Delta N/dt$ between the two is larger, the post-synchronization engine torque change amount $\Delta T_{eg-aft}$ is set at a larger value, allowing more secure restraint of torsional vibrations in the drive system resulting from the rotation acceleration difference $d\Delta N/dt$.

In this embodiment, in the control map in FIG. 7 referred to at the step S30 in FIG. 12, as mentioned above, the engine torque change amount limit value $\Delta T_{eb-lmt}$ is set at a small value in an area where the engine speed $N_{eg}$ is higher, i.e. in a so-called high rotation area. As a result, even if the engine torque change amount $(\Delta T_{eg-bfr}+\Delta T_{eg-aft})$ is set, the engine torque change amount $\Delta T_{eg-aft}$ is replaced with the engine torque change amount limit value $\Delta T_{eg-lmt}$ in the engine high rotation area through processing in FIG. 12. That is, correction of increasing engine torque is prohibited in the engine high rotation area. Before engagement of the one-way clutch OWC, prohibiting engine torque increasing correction in the engine high rotation area allows prevention of the engine speed $N_{eg}$ from being higher, and thus prevention of impossible synchronization with the motor/generator 2. And up to engagement of the direct-coupled clutch 36 after engagement of the one-way clutch OWC, it allows prevention of torque of the engine 1 from being too large or the motor/generator 2 from being too small, and thus prevention of release of the one-way clutch OWC once engaged, facilitating engagement of the direct-coupled clutch 36.

In this embodiment, the direct-coupled clutch 36 is engaged after engagement of the one-way clutch OWC. Alternatively, start of engagement of the direct-coupled clutch 36 can be carried out before engagement of the one-way clutch OWC, for example, which allows gradual reduction in the difference between the engine speed $N_{eg}$ and the motor/generator revolutions $N_{mg}$, leading to effective restraint of occurrence of vibrations resulting from rotation acceleration detection lag, clutch engagement lag, and torque correction response lag. Moreover, in this embodiment, correction of torque of the motor/generator 2 is made before engagement of the one-way clutch OWC. Alternatively, torque correction can be made only at engagement, which allows shortening of time required from vehicle starting to clutch engagement, achieving improved start-ability.

It is noted that processings in FIGS. 11 and 12 constitute means for correcting motor/generator torque, and the control map in FIG. 7 referred to at the step S30 in FIG. 12 constitutes means for prohibiting torque correction.

In the above embodiment, it is determined that the time when the difference between engine speed $N_{eg}$ and the motor/generator revolutions $N_{mg}$ becomes smaller than the predetermined value $\Delta N_1$ is a clutch engaging timing. Optionally, the clutch engaging timing can be determined otherwise, e.g. using the speed ratio "e", wherein clutch engaging control is made when the speed ratio "e" is larger than the predetermined value or close to 1, which can also be used for determination of the clutch engaging timing.

Having described the present invention with regard to the preferred embodiments, it is noted that the present invention is not limited thereto, and various changes and modifications can be made without departing from the scope of the present invention.

By way of example, in the illustrative embodiments, synchronization of the sun gear with the carrier is carried out by the one-way clutch. Optionally, synchronization may be achieved by a direct-coupled clutch of the multiple-disk friction type.

Moreover, in the illustrative embodiments, the direct-coupled clutch and the one-way clutch are interposed between the sun gear and the carrier of the planetary-gear set. Optionally, the direct-coupled clutch and the one-way clutch may be interposed between two of the three elements of the planetary-gear set, e.g. between the carrier and the ring gear.

Furthermore, in the illustrative embodiments, the ECU comprises a microcomputer. Alternatively, the ECU may comprise an arithmetic circuit.

The entire teachings of Japanese Patent Application 2001-055722 filed Feb. 28, 2001 are incorporated hereby by reference.

What is claimed is:

1. A parallel hybrid electric vehicle, comprising:
   an engine;
   a motor/generator having functions of a motor and a generator;
   a transmission;
   a differential gear comprising a first shaft connected to an output shaft of the engine, a second shaft connected to an output shaft of the motor/generator, and a third shaft connected to an input shaft of the transmission;
   an engagement device interposed between two of the first to third shafts of the differential gear, the engagement device being engaged when a difference in number of revolutions between the engine and the motor/generator is smaller than a predetermined value at starting of the vehicle; and
   an electronic control unit (ECU) which controls operating conditions of at least one of the engine and the motor/generator,
   wherein when the difference in number of revolutions is smaller than the predetermined value, the ECU sets a predetermined torque correction amount in accordance with a relationship between an inertia of the motor/generator and a value obtained by multiplying an inertia of the engine by a gear ratio of the differential gear, and
   wherein the ECU carries out a correction of torque of one of the engine and the motor/generator in accordance with the predetermined torque correction amount as set.

2. The parallel hybrid electric vehicle as claimed in claim 1, wherein when the motor/generator inertia is smaller than a value obtained by multiplying the engine inertia by a gear ratio of the differential gear, the torque correction is carried out to decrease the torque of the motor/generator by the predetermined torque correction amount.

3. The parallel hybrid electric vehicle as claimed in claim 1, wherein when the motor/generator inertia is larger than a value obtained by multiplying the engine inertia by a gear ratio of the differential gear, the torque correction is carried out to increase the torque of the motor/generator by the predetermined torque correction amount.

4. The parallel hybrid electric vehicle as claimed in claim 1, wherein when the motor/generator inertia is larger than a value obtained by multiplying the engine inertia by a gear ratio of the differential gear, the torque correction is carried out to decrease the torque of the engine by the predetermined torque correction amount.

5. The parallel hybrid electric vehicle as claimed in claim 4, wherein the predetermined torque correction amount is set at a larger value as a difference between the rotation acceleration of the engine and that of the motor/generator is larger.

6. The parallel hybrid electric vehicle as claimed in claim 1, wherein when the motor/generator inertia is smaller than a value obtained by multiplying the engine inertia by a gear ratio of the differential gear, the torque correction is carried out to increase the torque of the engine by the predetermined torque correction amount.

7. The parallel hybrid electric vehicle as claimed in claim 1, wherein the predetermined torque correction amount is determined in accordance with one of a rotation acceleration of the engine and that of the motor/generator when the difference in number of revolutions is smaller than the predetermined value.

8. The parallel hybrid electric vehicle as claimed in claim 1, wherein the ECU prohibits the torque correction when the number of revolutions of the engine is in a predetermined area.

9. The parallel hybrid electric vehicle as claimed in claim 1, wherein the engagement device comprises a multiple-disk friction clutch.

10. The parallel hybrid electric vehicle as claimed in claim 1, wherein the engagement device comprises a one-way clutch which allows one-direction rotation only.

11. A parallel hybrid electric vehicle, comprising:
    an engine;
    a motor/generator having functions of a motor and a generator;
    a transmission;
    a differential gear comprising a first shaft connected to an output shaft of the engine, a second shaft connected to an output shaft of the motor/generator, and a third shaft connected to an input shaft of the transmission;

an engagement device which carries out engagement and release between two of the first to third shafts of the differential gear; and an electronic control unit (ECU) which, at starting of the vehicle, puts the engagement device in a non-engaged state and controls torque of the motor/generator to maintain a number of revolutions of the engine at a predetermined number, wherein the ECU puts the engagement device in an engaged state when numbers of revolutions of the first to third shafts of the differential gear agree at least substantially with each other, and wherein the ECU carries out one of the following operations of:

decreasing the torque of the motor/generator at engagement of the engagement device when an inertia of the motor/generator is smaller than a value obtained by multiplying an inertia of the engine by a gear ratio of the differential gear;

increasing the torque of the motor/generator at engagement of the engagement device when the motor/generator inertia is larger than the value;

increasing the torque of the motor/generator at engagement of the engagement device when the motor/generator inertia is smaller than the value; and decreasing the torque of the motor/generator at engagement of the engagement device when the motor/generator inertia is larger than the value.

12. The parallel hybrid electric vehicle as claimed in claim 11, wherein the engagement device comprises a multiple-disk friction clutch.

13. The parallel hybrid electric vehicle as claimed in claim 11, wherein the engagement device comprises a one-way clutch which allows one-direction rotation only.

* * * * *